US012231549B1

(12) United States Patent
Stapleton

(10) Patent No.: US 12,231,549 B1
(45) Date of Patent: Feb. 18, 2025

(54) SYSTEMS AND METHODS FOR DEVICE AUTHENTICATION USING AUTHENTICATION TOKENS DERIVED FROM QUANTUM PARTICLES

(71) Applicant: Wells Fargo Bank, N.A., San Francisco, CA (US)

(72) Inventor: Jeff J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 228 days.

(21) Appl. No.: 18/149,541

(22) Filed: Jan. 3, 2023

(51) Int. Cl.
H04L 9/08 (2006.01)
H04L 9/40 (2022.01)

(52) U.S. Cl.
CPC .......... *H04L 9/0852* (2013.01); *H04L 63/083* (2013.01)

(58) Field of Classification Search
CPC ........................... H04L 9/0852; H04L 63/083
USPC ....................................................... 713/189
See application file for complete search history.

(56) References Cited

U.S. PATENT DOCUMENTS

| 8,559,640 | B2 | 10/2013 | Mohd et al. | |
| 8,595,812 | B2 * | 11/2013 | Bomar | G06F 21/45 |
| | | | | 713/172 |
| 9,698,979 | B2 | 7/2017 | Armstrong et al. | |
| 9,887,976 | B2 | 2/2018 | Hughes et al. | |
| 2018/0367526 | A1 * | 12/2018 | Huang | H04L 63/0807 |
| 2022/0006801 | A1 * | 1/2022 | Jankowski | H04L 63/0807 |
| 2023/0020656 | A1 * | 1/2023 | Momchilov | H04L 63/0807 |

OTHER PUBLICATIONS

Piotr K. Tysowski, et al., The Engineering of a Scalable Multi-Site Communications System Utilizing Quantum Key Distribution (QKD), Dec. 7, 2017.
Hazel Murray, et al., Quantum Multi-Factor Authentication, Oct. 11, 2021.
Meltem Sonmez Turan, et al., Recommendation for the Entropy Sources Used for Random Bit Generation, NIST Special Publication 800-90B, Jan. 2018.
Elaine Barker, Recommendation for Key Management: Part 1—General, NIST Special Publication 800-57 Part 1 Revision 5, May 2020.
(Continued)

*Primary Examiner* — Teshome Hailu
(74) *Attorney, Agent, or Firm* — K&L Gates LLP

(57) ABSTRACT

Systems, apparatuses, methods, and computer program products are disclosed for authentication of devices. An example method includes an authentication technique utilizing authentication tokens. Authentication tokens may be bit strings associated with time intervals and may be derived from quantum particles. Quantum particles may be obtained by two or more devices in a continuous stream via quantum key distribution. Devices throughout a distributed system may read the quantum particles at previously established time intervals, obtain bit strings, and use the bit strings as authentication tokens to perform one, multiple, and/or continuous authentication processes. Each device may have access to matching authentication tokens without exchanging any authentication tokens between devices and, therefore, the authentication tokens may be used as shared secrets to facilitate a more secure connection between devices.

20 Claims, 8 Drawing Sheets

(56) References Cited

OTHER PUBLICATIONS

Richard Moulds, et al., Random Number Generation Is Getting Harder—It's Time to Pay Attention, RSA 2017 Conference, PDAC-F03, Feb. 2017.
Charles H. Bennett, et al., Quantum cryptography: Public key distribution and coin tossing. In Proceedings of IEEE International Conference on Computers, Systems and Signal Processing, vol. 175, p. 8. New York, 1984.
Artur K. Ekert, Quantum cryptography based on Bell's theorem Physical Review Letters. 67 (6): 661-663, Aug. 5, 1991.

* cited by examiner

SYSTEMS AND METHODS FOR DEVICE AUTHENTICATION USING AUTHENTICATION TOKENS DERIVED FROM QUANTUM PARTICLES

BACKGROUND

Modern systems may facilitate communication between parties at various physical locations out of eyesight of one another. Such systems may be highly distributed with various components being located substantial distances from one another. The distances between these components and the manner of operation of the components may allow for third parties to gain access to communications between parties over these systems.

BRIEF SUMMARY

Communication systems facilitate a broad array of interactions between computer systems and users thereof. As part of these interactions, the computer systems may send and receive sensitive information. Due to the value of the sensitive information, third parties may attempt to modify sensitive information or masquerade as a legitimate party.

These third parties may use a range of methods of obtaining copies of sensitive information that exploit the operation of communications systems. For example, the third parties may impersonate actors in the system to convince other actors (e.g., those authorized to send and access sensitive information) to send copies of sensitive information to the third parties. In another example, third parties may attempt to modify data-in-transit or data-at-rest.

To reduce the likelihood of the sensitive information being obtained by unintended recipients (e.g., third parties), the devices throughout a distributed system may perform one or more authentication processes and/or a persistent authentication process. Systems, apparatuses, methods, and computer program products are disclosed herein for authenticating devices using bit strings derived from quantum particles in a distributed system. Quantum particles may refer to instances of any type of particle with unknown quantum states. A quantum particle may be a quantum entangled particle in some implementations, but entanglement is not necessary in every embodiment. Although this disclosure refers to quantum particles as quantum entangled particles for simplicity, it will be understood that any methods, apparatuses, systems, and computer program products discussed herein that do not expressly require use of entanglement may be implemented with other types of quantum particles (e.g., those that are not entangled with other quantum particles) without departing from embodiments disclosed herein. By performing device authentication using bit strings derived from quantum entangled particles, unintended recipients may be less likely to obtain sensitive information via the methods described above.

To authenticate devices, a system may exchange at least a portion of one or more authentication tokens, authentication tokens including bit strings obtained via distribution of pairs of quantum entangled particles via transmission systems (e.g., fiber optics, etc.) to devices for authentication. The system may distribute one quantum entangled particle of each pair (or triplet or high numbers) of quantum entangled particles to a device (e.g., a participating device) seeking to secure communications with a second device (e.g., an initiating device), or multiple devices. The initiating device and the participating device may read (e.g., measure) the quantum entangled particles in order to obtain bit strings. The quantum entangled particles may be distributed in a continuous stream to the devices and, therefore, the devices may divide bit strings using time intervals, the time intervals indicating when the quantum entangled particles are received by the devices. In order to establish consistent time intervals between devices, the initiating device and participating device may utilize shared and/or otherwise synchronized clocks. Consequently, the initiating device and participating device may have access to identical (e.g., matching or substantially similar) authentication tokens and may use these authentication tokens to, for example, authenticate (at least in part) each other, secure communications between the recipient and the other device, and/or otherwise reduce the likelihood of transmitting sensitive information to unintended recipients.

In one example embodiment, a method is provided for authentication between an initiating device and a participating device operably connected to each other with a communication network and quantum distribution medium used to transmit data between the initiating device and the participating device. The method may include identifying, by authentication circuitry of the initiating device, an action event to initiate an authentication process with the participating device. The method may also include performing, at least in part by the authentication circuitry and based on the action event, the authentication process with the participating device to establish an authentication state of the participating device, the authentication process using at least a portion of one or more authentication tokens while continuously updating the one or more authentication tokens using quantum particles obtained during the authentication process and using the quantum distribution medium. The method may also include making a determination, by the authentication circuitry and based on the authentication state of the participating device, that the authentication process is successful. In the event that the determination indicates that the authentication process is successful, the method may also include treating, by the authentication circuitry and based on the determination, the participating device as being provisionally authenticated.

In the event that the authentication process is unsuccessful, the method may include performing, at least in part by the authentication circuitry and based on the second determination, an action set to remediate the authentication state of the participating device.

In a first example, the authentication process may comprise several actions. First, the authentication circuitry of the initiating device may obtain an authentication token of the one or more authentication tokens. Second, the communication hardware of the initiating device may request a complementary authentication token from the participating device. Third, the communication hardware of the initiating device may obtain the complementary authentication token from the participating device. Fourth, the authentication circuitry of the initiating device may make a second determination that the complementary authentication token matches the authentication token. The complementary authentication token may match the authentication token when pairs of the quantum particles are distributed to the initiating device and the participating device. Fifth, the authentication circuitry of the initiating device may obtain the authentication state of the participating device based on the second determination.

In a second example, the authentication process may comprise several actions. First, the authentication circuitry of the initiating device may obtain a second authentication token of the one or more authentication tokens. Second, the communication hardware of the initiating device may request a second complementary authentication token from the participating device. Third, the communication hardware of the initiating device may obtain the second complementary authentication token from the participating device. Fourth, the authentication circuitry of the initiating device may make a third determination that the second complementary authentication token does not match the second authentication token. The second complementary authentication token may match the second authentication token when pairs of the quantum particles are distributed to the initiating device and the participating device. Fifth, the authentication circuitry of the initiating device may obtain a second authentication state of the participating device based on the third determination.

In a third example, the authentication process may comprise several actions. First, the authentication circuitry of the initiating device may obtain a first authentication token of the one or more authentication tokens. Second, the authentication circuitry of the initiating device may obtain an offset. Third, the communication hardware of the initiating device may transmit the offset to the participating device. Fourth, the communication hardware of the initiating device may transmit the first authentication token to the participating device. Fifth, the communication hardware of the initiating device may obtain a complementary authentication token from the participating device. Sixth, the authentication circuitry of the initiating device may make a second determination, based on the offset, that the complementary authentication token matches a second authentication token. The second authentication token may be based on the first authentication token and the offset. The complementary authentication token may match the second authentication token when pairs of the quantum particles are distributed to the initiating device and the participating device. Seventh, the authentication circuitry of the initiating device may obtain the authentication state of the participating device based on the second determination.

In a fourth example, the authentication process may comprise several actions. First, the authentication circuitry of the initiating device may obtain a portion of an authentication token of the one or more authentication tokens. Second, the communication hardware of the initiating device may transmit the portion of the authentication token to the participating device. Third, the communication hardware of the initiating device may obtain a portion of a complementary authentication token. Fourth, the authentication circuitry of the initiating device may make a determination that the portion of the complementary authentication token matches a portion of a third authentication token, the portion of the third authentication token being associated with the portion of the authentication token. Fifth, the authentication circuitry of the initiating device may obtain the authentication state of the participating device based on the determination.

In a fifth example, the authentication process may comprise several actions. First, the authentication circuitry of the initiating device may select a portion of an authentication token of the one or more authentication tokens. Second, the communication hardware of the initiating device may send a challenge based on the portion of the authentication token to the participating device. Third, the communication hardware of the initiating device may obtain a challenge response from the participating device. Fourth, the authentication circuitry of the initiating device may make a second determination that the challenge response matches the portion of the authentication token. Fifth, the authentication circuitry of the initiating device may elect to continue an authentication of the participating device based on the second determination and based on an unmet confidence level requirement.

The authentication process may comprise performing a synchronization, by the authentication circuitry, of the one or more authentication tokens with a corresponding one or more authentication tokens of the participating device. The synchronization may account for differences between clocks used by the initiating device and the participating device. The synchronization may comprise exchanging, by communication hardware of the initiating device, a portion of the one or more authentication tokens of the initiating device and a portion of the one or more authentication tokens of the participating device. The synchronization may also comprise using the exchanged portions, by the authentication circuitry, to identify an authentication token indexing difference between the initiating device and the participating device.

In another example embodiment, an initiating device is provided. The initiating device may include authentication circuitry configured to identify an action event to initiate an authentication process with a participating device. The authentication circuitry is further configured to perform at least a part of an authentication process, based on the action event, with the participating device to establish an authentication state of the participating device, the authentication process using at least a portion of one or more authentication tokens while continuously updating the one or more authentication tokens using quantum particles obtained during the authentication process and using a quantum distribution medium. The authentication circuitry is further configured to make a determination, based on the authentication state of the participating device, that the authentication process is successful. In the event that the determination indicates that the authentication process is successful, the authentication circuitry is further configured to treat, based on the determination, the participating device as being provisionally authenticated.

The foregoing brief summary is provided merely for purposes of summarizing some embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain embodiments in general terms above, reference will now be made to the accompanying drawings, which are not necessarily drawn to scale. Some embodiments may include fewer or more components than those shown in the figures.

DETAILED DESCRIPTION

Figure 1:
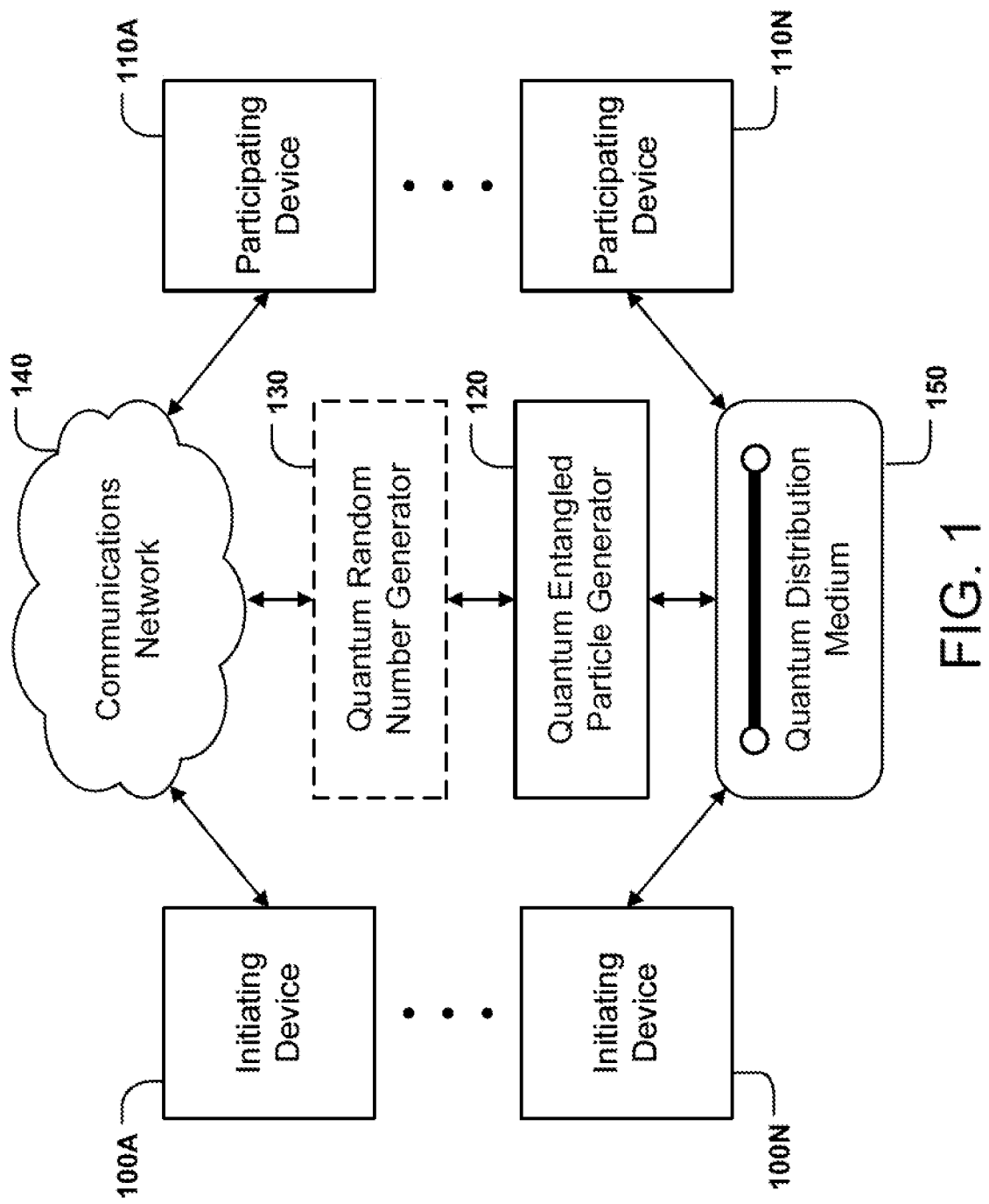
FIG. 1 illustrates a system in which some embodiments may be used for authenticating devices and/or users thereof.

Some embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, embodiments described herein provide methods, apparatuses, systems, and computer program products are described herein that provide for authentication of devices in a distributed system. The distributed system may allow the devices and users to provide and obtain various services including, for example, data distribution and/or other types of computer-implemented services. As part of these services, sensitive information may be distributed within the distributed system.

Authentication of devices in distributed systems may be challenging due to the distance between the devices and the complexity of the environment in which the devices reside. Authentication of devices utilizing a password, pin, and/or other knowledge factor may require the devices to "know" and/or store a version of the knowledge factor. The knowledge factor may also be transmitted in some form between devices in order to be "known" by both devices. This method may leave devices vulnerable to interference from third parties who may gain access to the user's password and impersonate the user in an authentication process. In addition, authentication of devices using a biometric and/or other inherence factor may require a user to scan a live sample and transmit the scan of the sample to another device. However, this method does not guarantee the legitimacy of the user scanning the live sample. A live sample may be scanned by a third party in order to gain access to sensitive information intended for the legitimate user of the device. Other authentication factors, such as possession factors may require the management of physical (and/or virtual) devices to manage the one-time authentication tokens, cryptographic keys, etc. These methods may be vulnerable to theft of the device, attack by a third party impersonating an authentication intermediary, and/or other security breaches. In all of the above mentioned authentication methods, sensitive information may be distributed to unintended recipients in these distributed systems.

To reduce the likelihood of sensitive information being distributed to unintended recipients, embodiments may provide for device authentication via continuous quantum key distribution. Continuous quantum key distribution may utilize a continuous stream of quantum entangled particles distributed to each device in a distributed system. By doing so, third parties may be less likely to successfully interfere in communications between devices and obtain sensitive information.

For example, the disclosed embodiments may facilitate distribution of a continuous stream of quantum entangled particles to devices (e.g., to-be-authenticated devices) prior to and/or during the exchange of sensitive information between the devices. The devices that receive the continuous stream of quantum entangled particles may use the quantum entangled particles to obtain bit strings known to the devices attempting to authenticate the devices.

The use of quantum entangled particles as an authentication factor may allow for confirmation that two (or more) devices may have access to identical bit strings obtained from quantum entangled particles. However, a single authentication process may be insufficient for establishing secure connections over an extended period of time. Over time, the strength of the secure connection may be jeopardized and additional authentication processes may be necessary to secure the connection.

In order to facilitate the performance of multiple and/or persistent authentication processes, quantum entangled particles may be distributed to the devices in a continuous stream rather than as-needed. By doing so, each device in the distributed system may continuously replenish bit strings derived from the quantum entangled particles. These bit strings may be divided by time intervals over which they are obtained and, therefore, the devices may agree upon a system for sharing and/or synchronizing clocks in order to establish consistent time intervals (or alignment between the obtained bit strings). The combination of the distribution of quantum entangled particles and continuous replenishment of bit strings for authentication may provide for lasting secure connections between devices.

Following authentication of the two devices using one, multiple, or continuous authentication processes, a secure connection may be established and sensitive information may be exchanged. In addition to being usable for authentication, the bit strings obtained from the quantum entangled particles may also be utilized for communication security purposes. For example, the bit strings may be utilized to obtain symmetric keys, may be used as one time pads, and/or may be otherwise used to secure the exchange of sensitive information between devices in the distributed system after the devices participating in the exchange have been authenticated.

Although a high level explanation of the operations of embodiments has been provided above, specific details regarding the configuration of such embodiments are provided below.

System Architecture

Embodiments described herein may be implemented using any number and type of computing devices. To this end, FIG. 1 illustrates an example environment within which various embodiments may operate. As illustrated, the environment may include any number of initiating devices 100A-100N and participating devices 110A-110N. These devices may interact with one another to perform any number and types of services. When performing the services, the devices may exchange sensitive information. However, prior to exchanging sensitive information, the devices may facilitate authentication of one another using authentication tokens, authentication tokens being based on quantum entangled particles previously known by the devices. The authentication tokens may be based on bit strings derived from the quantum entangled particles and may be associated with time intervals, the time intervals indicating when the quantum entangled particles were obtained by the devices. The initiating devices 100A-100N and the participating devices 110A-110N may have access to identical (or substantially similar) authentication tokens without exchanging authentication tokens prior to performing an authentication process.

As used herein, the term initiating device refers to a device that is initiating authentication of another device (e.g., a participating device). Likewise, the term participating device refers to a device that is participating in the authentication initiated by another device. Any device may be an initiating device and/or a participating device (for example, a device may be both in the process of authenticating another device while also being authenticated by a different device) depending on their role, which may change over time.

Returning to the discussion of the services provided by these devices, these devices may authenticate one or more devices participating in the services, secure communications between these devices, and/or perform other protective actions to reduce the likelihood of third parties participating in and/or receiving the services. As part of performing the services, any of the devices may transmit sensitive information to one another. By authenticating, securing communications, and/or performing other protective actions, these devices may reduce the likelihood of sensitive information being distributed to unintended recipients.

The initiating devices 100A-100N may be implemented using any number (one, many, etc.) and types of computing devices known in the art, such as desktop or laptop computers, tablet devices, smartphones, or the like. The initiating devices may be associated with corresponding users (e.g., administrators, customers, representatives, other persons, etc.) that use the initiating devices 100A-100N to interact with one or more participating devices 110A-110N.

The users and/or applications hosted by the initiating devices 100A-100N may transmit sensitive information to and/or receive sensitive information from the participating devices 110A-110N when interacting with them (and/or other devices). The sensitive information may include, for example, financial information, future plans, personal information, and/or other types of information that may be exploited by unintended recipients of the sensitive information. The unintended recipients may obtain the sensitive information by inadvertent transmission by the initiating devices 100A-100N or through intentional action by the unintended recipients to obtain the sensitive information. To reduce the likelihood of the sensitive information being obtained by unintended recipients, the initiating devices 100A-100N may perform device authentication as part of or with the services provided by the initiating devices 100A-100N and participating devices 110A-110N.

The participating devices 110A-110N may be implemented using any number and types of computing devices known in the art, such as desktop or laptop computers, tablet devices, smartphones, or the like. The participating devices 110A-110N may provide computer-implemented services to and/or receive computer-implemented services from the initiating devices 100A-100N and/or other devices.

Like the initiating devices 100A-100N, the participating devices 110A-110N may be associated with corresponding users (e.g., administrators, customers, representatives, other persons, etc.) that use the participating devices 110A-110N to interact with one or more of the initiating devices 100A-100N (and/or other devices). The users and/or applications hosted by the participating devices may transmit and/or receive sensitive information to or from the initiating devices 100A-100N when interacting with them (and/or other devices). To reduce the likelihood of sensitive information being distributed to unintended recipients, the participating devices may perform device authentication as part of or with the services provided by the participating devices 110A-110N and initiating devices 100A-100N.

The initiating devices 100A-100N and the participating devices 110A-110N may cooperatively provide various computer-implemented services to accomplish desirable goals for their respective users. For example, consider a scenario in which an initiating device is being used by a bank to communicate with a banking client that uses a participating device. The bank may desire to send financial information to the banking client. Prior to doing so, the initiating device and/or participating device may perform an authentication process in order to verify the legitimacy of the devices participating in the authentication process. Performing device authentication may reduce the likelihood of unintended recipients gaining access to the financial information.

To reduce the likelihood of unintended recipients obtaining information transmitted between initiating devices 100A-100N and participating devices 110A-110N, embodiments disclosed herein may provide for the performance of device authentication using a continuous stream of quantum entangled particles. The quantum entangled particles may be continuously distributed to devices throughout a distributed system and, therefore, may be continuously replenished for use in repeated and/or persistent authentication processes. The continuous distribution of quantum entangled particles to devices may involve a repeated cycle of generation and distribution of quantum entangled particles. This repeated cycle of generation and distribution of quantum entangled particles may be interrupted, paused, and/or otherwise disrupted in the event of technical issues, connectivity issues, and/or as needed to facilitate the operation of the initiating devices 100A-100N and the participating devices 110A-110N. The continuous distribution of quantum entangled particles may be disrupted in other ways and/or for other reasons without departing from embodiments disclosed herein.

The quantum entangled particles may be used for device authentication via quantum key distribution. Quantum key distribution may allow for establishing a shared secret between two devices (e.g., initiating and participating devices). To perform device authentication, in one or more embodiments, all or a portion of the initiating devices 100A-100N and the participating devices 110A-ION may include specialized hardware for "reading" (e.g., measuring) quantum entangled particles. By measuring the quantum entangled particles, the entanglement may be collapsed and authentication tokens may be obtained by pairs of initiating and participating devices. Authentication tokens may include bit strings associated with particular time intervals. The authentication tokens may be continuously replenished and, therefore, may allow for persistent authentication of devices throughout a distributed system. The use of bit strings derived from quantum entangled particles may allow for detection of third parties attempting to listen in on the distributed bit strings, thereby facilitating a higher degree of security than that afforded through classical communications.

In an embodiment, the system of FIG. 1 includes a quantum entangled particle generator 120. The quantum entangled particle generator 120 may continuously generate pairs of quantum entangled particles. One quantum entangled particle of each pair of quantum entangled particles may be distributed to an initiating device and second entangled particle of each pair of quantum entangled particles may be distributed to a participating device via the quantum distribution medium 150 in a continuous stream. Upon receiving the quantum entangled particles from the quantum entangled particle pair, both the initiating and participating device may "read" (e.g., measure) the quantum entangled particles and obtain identical bit strings. Consequently, both the initiating and participating device may have access to the shared secret (e.g., the bit string) without transmitting the shared secret between the devices.

In an embodiment, the initiating devices 100A-100N and the participating devices 110A-110N do not include functionality to read quantum entangled particles. For example, some or all of these devices may not include hardware necessary to read quantum entangled particles. Rather than reading the quantum entangled particles, these devices may use a quantum random number generator 130 to obtain random number sequences. The initiating devices 100A-100N and participating devices 110A-110N may use the random number sequences as shared secrets to perform device authentication.

The quantum random number generator 130 may be implemented using any number (one, many, etc.) and types of computing devices known in the art, such as desktop or laptop computers, tablet devices, smartphones, or the like.

The quantum random number generator 130 may provide for the distribution of random number sequences to the initiating devices 100A-100N and the participating devices 110A-110N. To do so, the quantum random number generator 130 may obtain pairs of quantum entangled particles from the quantum entangled particle generator 120, read the quantum entangled particles (thereby collapsing the entanglement), and obtain pairs of random number sequences. The quantum random number generator 130 may establish a secure connection to the devices and distribute one random number sequence of each pair of random number sequences to the initiating devices 100A-100N and participating devices 110A-110N using the secure connection. Consequently, the initiating devices 100A-100N and participating devices 110A-110N may use the random number sequences as shared secrets to perform device authentication without needing to include the functionality to read quantum entangled particles.

To facilitate communications, any of the devices shown in FIG. 1 may be operably connected to each other with communications network 140 and/or quantum distribution medium 150. Communications network 140 and/or quantum distribution medium 150 may facilitate communications with one or more wired and/or wireless networks implemented using any suitable communications technology. In one embodiment, communications network 140 and/or quantum distribution medium 150 may include any number and type of transmission mediums (e.g., electrical cabling, optical cabling, free space channels, etc.) through which signals (e.g., electrical, optical, etc.) on which data is encoded may be distributed amongst the devices. The communications network 140 and/or quantum distribution medium 150 may be implemented using any number and types of communication protocols. The functionality of communications network 140 and quantum distribution medium 150 may be integrated into a single entity (e.g., an optical communication network over which data and entangled photons of pairs of entangled photons may be distributed).

In an embodiment, quantum entangled particles may be injected locally into devices (e.g., initiating devices, participating devices, etc.) at a secure facility (e.g., a quantum injection facility (QIF)). The devices may then be distributed (e.g., shipped) to various users, allowing a user of each device to obtain identical information directly from a respective one of the devices via the previously injected quantum entangled particles without directly exchanging any information after the devices are provided to users of the devices.

Although FIG. 1 illustrates an environment and implementation in which various functionalities are performed by different devices, in some embodiments some or all of the functionalities of the initiating devices 100A-100N, participating devices 110A-110N, quantum entangled particle generator 120, and/or quantum random number generator 130 are aggregated into a single device.

Example Implementing Apparatuses

Figure 2A:
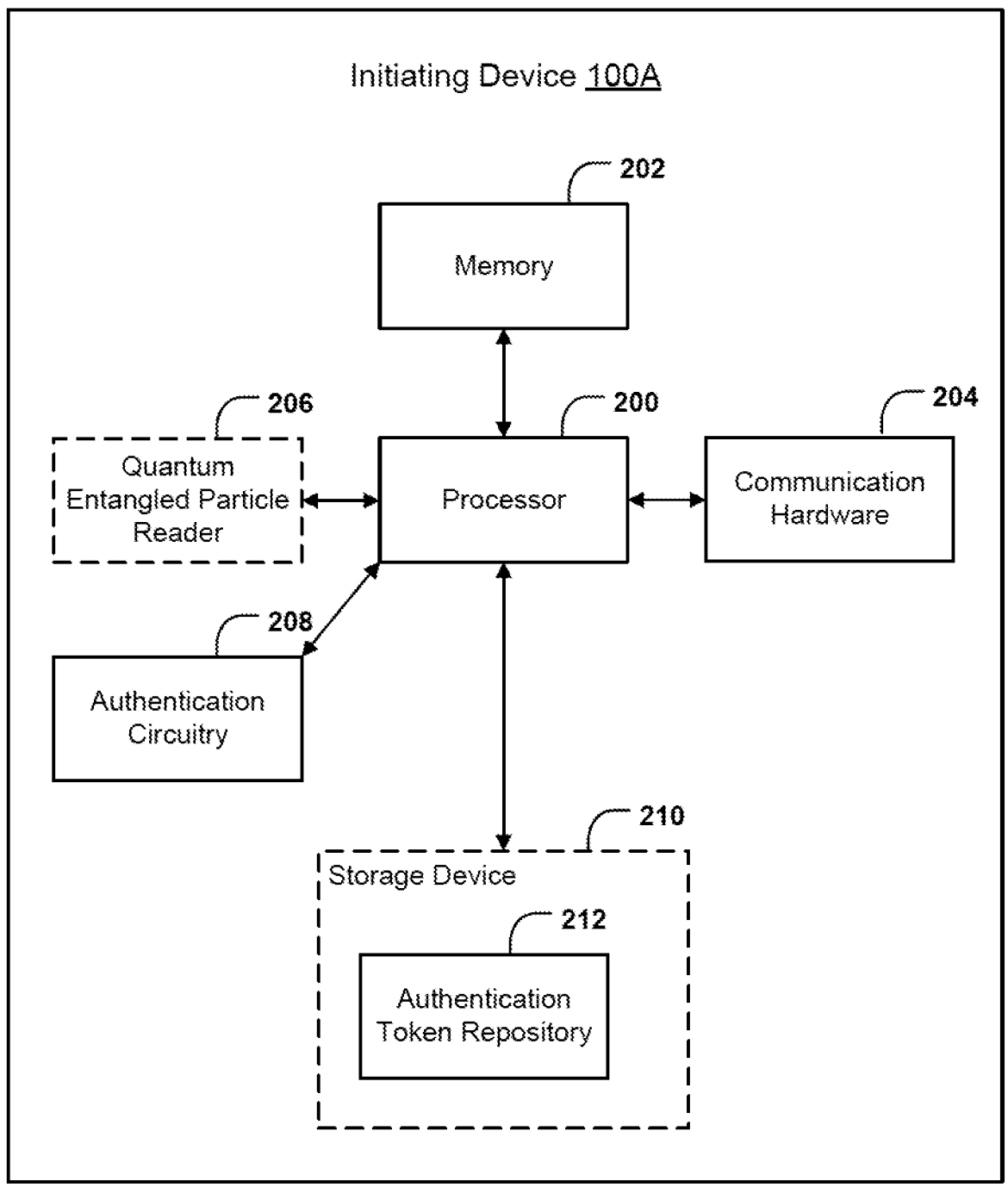
FIG. 2A illustrates a schematic block diagram of example circuitry embodying an initiating device that may perform various operations in accordance with some embodiments described herein.

Turning to FIG. 2A, any of initiating devices 100A-100N may be embodied by one or more computing devices or servers, shown as initiating device 100A in FIG. 2A. As illustrated in FIG. 2A, the initiating device 100A may include processor 200, memory 202, communication hardware 204, quantum entangled particle reader 206, authentication circuitry 208, and storage device 210, each of which will be described in greater detail below. While the various components are only illustrated in FIG. 2A as being connected with processor 200, it will be understood that the initiating device 100A may further comprise a bus (not expressly shown in FIG. 2A) for passing information amongst any combination of the various components of the initiating device 100A. The initiating device 100A may be configured to execute various operations described above in connection with FIG. 1 and below in connection with FIGS. 3A-4C.

The processor 200 (and/or co-processor or any other processor assisting or otherwise associated with the processor) may be in communication with the memory 202 via a bus for passing information amongst components of the apparatus. The processor 200 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the initiating device 100A, remote or "cloud" processors, or any combination thereof.

The processor 200 may be configured to execute software instructions stored in the memory 202 or otherwise accessible to the processor (e.g., software instructions stored on a separate or integrated storage device 210). In some cases, the processor may be configured to execute hard-coded functionality. As such, whether configured by hardware or software methods, or by a combination of hardware with software, the processor 200 represents an entity (e.g., physically embodied in circuitry) capable of performing operations according to various embodiments of the present invention while configured accordingly. Alternatively, as another example, when the processor 200 is embodied as an executor of software instructions, the software instructions may specifically configure the processor 200 to perform the algorithms and/or operations described herein when the software instructions are executed.

Memory 202 is non-transitory and may include, for example, one or more volatile and/or non-volatile memories. In other words, for example, the memory 202 may be an electronic storage device (e.g., a computer readable storage medium). The memory 202 may be configured to store information, data, content, applications, software instructions, or the like, for enabling the apparatus to carry out various functions in accordance with embodiments described herein.

The communication hardware 204 may be any means such as a device or circuitry embodied in either hardware or a combination of hardware and software that is configured to receive and/or transmit data from/to a network and/or any other device, circuitry, or module in communication with the initiating device 100A. In this regard, the communications hardware 204 may include, for example, a network interface for enabling communications with a wired or wireless communication network. For example, the communications hardware 204 may include one or more network interface cards, antennas, buses, switches, routers, modems, and supporting hardware and/or software, or any other device suitable for enabling communications via a network. Furthermore, the communications hardware 204 may include the processing circuitry for causing transmission of such signals to a network or for handling receipt of signals received from a network.

In addition, initiating device 100A further comprises quantum entangled particle reader 206 configured to "read" (e.g., measure) quantum entangled particles to obtain bit strings. When reading the quantum entangled particles, quantum entangled particle reader 206 may cause authentication tokens (e.g., the bit strings) to be generated and/or stored in authentication token repository 212. Quantum entangled particle reader 206 may utilize processor 200, memory 202, or any other hardware component included in the initiating device 100A to perform these operations, as described in connection with FIGS. 3A-4C below. The quantum entangled particle reader 206 may further utilize communication hardware 204 to gather data from a variety of sources (e.g., participating devices 110A-110N or storage device 210, as shown in FIG. 1), obtain quantum entangled particles for reading, and in some embodiments may utilize processor 200 and/or memory 202 to obtain and store bit strings following the reading of quantum entangled particles.

In addition, initiating device 100A further comprises authentication circuitry 208 that is configured to provide device authentication services which may include requesting one or more authentication tokens from participating devices 110A-110N, retrieving one or more authentication tokens from authentication token repository 212 for transmission to (or other use with respect to) participating devices 110A-110N, comparing one or more authentication tokens provided by participating devices 110A-110N to one or more corresponding authentication tokens (e.g., from the same time interval) from authentication token repository 212 in order to determine an authentication state for participating devices 110A-110N, and/or otherwise facilitating authentication processes between devices in a distributed system. Authentication circuitry 208 may utilize processor 200, memory 202, or any other hardware component included in the initiating device 100A to perform these operations, as described in connection with FIGS. 3A-4C below. The authentication circuitry 208 may further utilize communication hardware 204 to gather data from a variety of sources (e.g., participating devices 110A-110N or storage device 210, as shown in FIG. 1), and in some embodiments may utilize processor 200 and/or memory 202 to facilitate device authentication processes.

Finally, initiating device 100A may include storage device 210 that stores data structures used by quantum entangled particle reader 206 and/or authentication circuitry 208 to provide their functionalities. Storage device 210 may be a non-transitory storage and include any number and types of physical storage devices (e.g., hard disk drives, tape drives, solid state storage devices, etc.) and/or control circuitry (e.g., disk controllers usable to operate the physical storage devices and/or provide storage functionality such as redundancy, deduplication, etc.).

As noted above, authentication token repository 212 may store any quantity of authentication tokens obtained by quantum entangled particle reader 206. Authentication token repository 212 may be hosted by initiating device 100A, while another authentication token repository may be hosted by a second device (e.g., participating device 110A) throughout a distributed system. The authentication tokens may be obtained by reading quantum entangled particles provided by quantum entangled particle generator 120. Consequently, initiating device 100A and the second device (e.g., participating device 110A) may have access to identical (or substantially similar) authentication tokens (e.g., presuming that there are no read errors on either end, and all of the pairs of quantum entangled particles remain entangled during transport) that may be known to be secure (e.g., through processes for detecting snooping of information distributed via quantum entangled particles). In addition, authentication token repository 212 may include any number of associations, categorizations, etc. to facilitate device authentication. For example, each authentication token in authentication token repository 212 may include a bit string and may be associated with a particular time interval, the time interval indicating the time over which the quantum entangled particles associated with the authentication token were obtained by the initiating device 100A. Authentication token repository 212 may be implemented using any number and types of data structures (e.g., database, lists, tables, linked lists, etc.). In another example, the authentication tokens may be ordered with respect to one another (but may not include time intervals) to indicate an order in which the corresponding quantum entangled particles are received.

In an embodiment, authentication tokens may be obtained by initiating device 100A via quantum key distribution. Quantum entangled particle generator 120 may distribute pairs of quantum entangled particles to devices (e.g., initiating and participating devices) throughout a distributed system. For example, one quantum entangled particle of each pair of quantum entangled particles may be distributed to initiating device 100A and the second quantum entangled particle of each pair of quantum entangled particles may be distributed to participating device 110A. Therefore, initiating device 100A and participating device 110A may have access to identical quantum entangled particles.

Quantum entangled particles may be read by quantum entangled particle reader 206 thereby collapsing the entanglement of the quantum entangled particles and obtaining an authentication token (e.g., a bit string). The quantum entangled particles may be distributed continuously to the devices and, therefore, each authentication token derived from the quantum entangled particles may be associated with a particular time interval. The quantum entangled particle reader 206 may store the authentication tokens in authentication token repository 212 along with some identifying information. The identifying information may include the time interval, which may be used to identify an authentication token being used for a particular authentication process.

While illustrated in FIG. 2A as being a part of initiating device 100A, the authentication token repository 212 may be stored (partially or entirely) in a different device operably connected to initiating device 100A.

Although components 200-212 are described in part using functional language, it will be understood that the particular implementations necessarily include the use of particular hardware. It should also be understood that certain of these components 200-212 may include similar or common hardware. For example, the quantum entangled particle reader 206 and authentication circuitry 208 may each at times leverage use of the processor 200, memory 202, communication hardware 204, and/or storage device 210, such that duplicate hardware is not required to facilitate operation of these physical elements of the initiating device 100A (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the initiating device 100A to perform the various functions described herein.

Although quantum entangled particle reader 206 and authentication circuitry 208 may leverage processor 200 or memory 202 as described above, it will be understood that any of these elements of initiating device 100A may include one or more dedicated processor, specially configured field programmable gate array (FPGA), or application specific interface circuit (ASIC) to perform its corresponding functions, and may accordingly leverage processor 200 executing software stored in a memory (e.g., memory 202), or memory 202, or communication hardware 204 for enabling any functions not performed by special-purpose hardware elements. In all embodiments, however, it will be understood that the processor 200, memory 202, communication hardware 204, and storage device 210 are implemented via particular machinery designed for performing the functions described herein in connection with such elements of initiating device 100A.

In some embodiments, various components of the initiating device 100A may be hosted remotely (e.g., by one or more cloud servers) and thus need not physically reside on the corresponding initiating device 100A. Thus, some or all of the functionality described herein may be provided by third-party circuitry. For example, a given initiating device 100A may access one or more third-party circuitries via any sort of networked connection that facilitates transmission of data and electronic information between the initiating device 100A and the third-party circuitries. In turn, that initiating device 100A may be in remote communication with one or more of the other components describe above as comprising the initiating device 100A.

As will be appreciated based on this disclosure, embodiments described herein may be implemented by an initiating device 100A. Furthermore, some embodiments may take the form of a computer program product comprising software instructions stored on at least one non-transitory computer-readable storage medium (e.g., memory 202). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by initiating device 100A as described in FIG. 2A, that loading the software instructions onto a computing device or apparatus produces a special-purpose machine comprising the means for implementing various functions described herein.

Figure 2B:
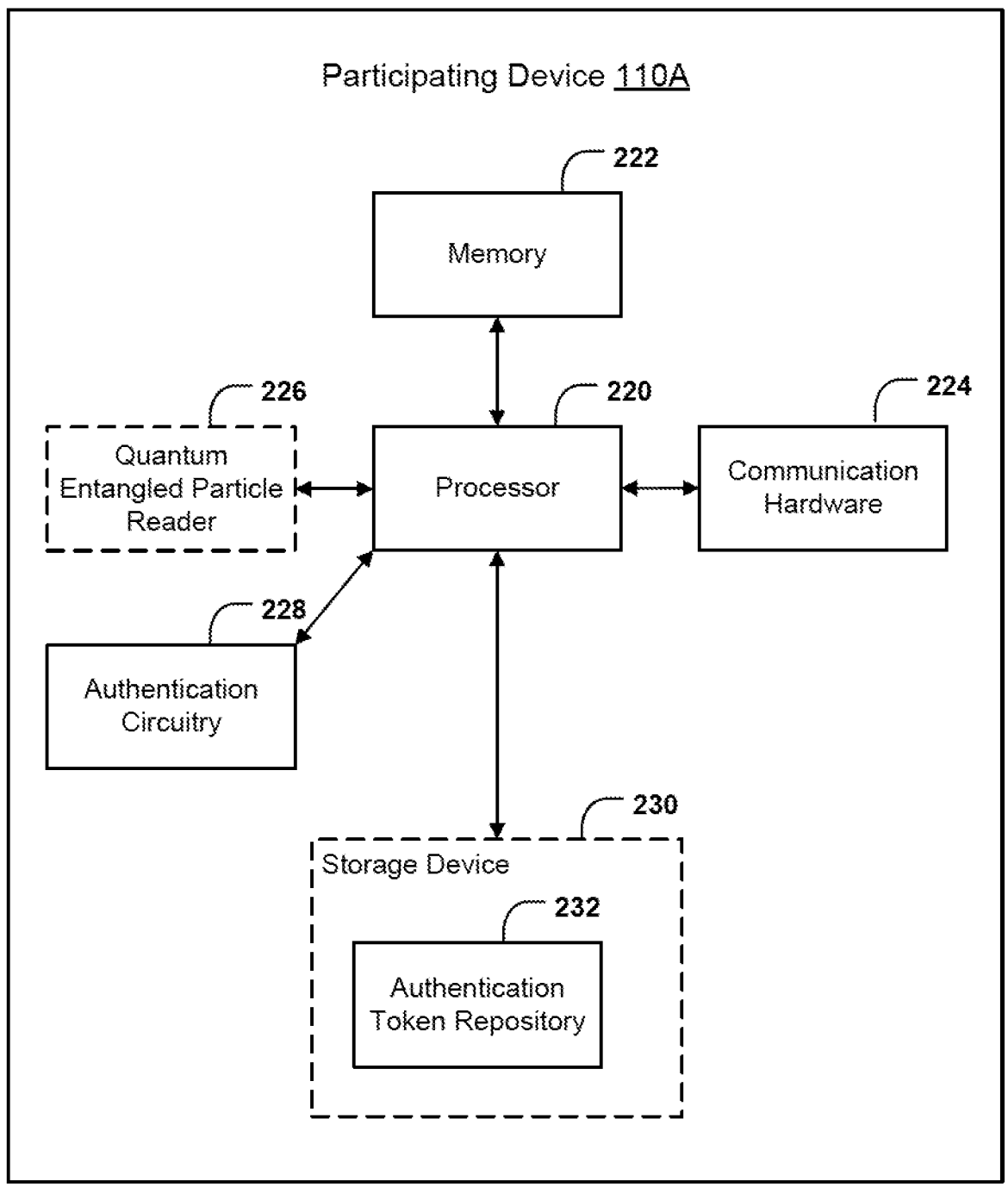
FIG. 2B illustrates a schematic block diagram of example circuitry embodying a participating device that may perform various operations in accordance with some embodiments described herein.

Turning to FIG. 2B, any of participating devices 110A-110N may be embodied by one or more computing devices or servers, shown as participating device 110A in FIG. 2B. As illustrated in FIG. 2B, the participating device 110A may include processor 220, memory 222, quantum entangled particle reader 226, authentication circuitry 228, and storage device 230, each of which will be described in greater detail below. While the various components are only illustrated in FIG. 2B as being connected with processor 220, it will be understood that the participating device 110A may further comprise a bus (not expressly shown in FIG. 2B) for passing information amongst any combination of the various components of the participating device 110A. The participating device 110A may be configured to execute various operations described above in connection with FIG. 1 and below in connection with FIGS. 3A-4C.

The processor 220 (and/or co-processor or any other processor assisting or otherwise associated with the processor) may be in communication with the memory 222 via a bus for passing information amongst components of the apparatus. The processor 220 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the participating device 110A, remote or "cloud" processors, or any combination thereof.

The processor 220 may be configured to execute software instructions stored in the memory 222 or otherwise accessible to the processor (e.g., software instructions stored on a separate or integrated storage device 230). In some cases, the processor may be configured to execute hard-coded functionality. As such, whether configured by hardware or software methods, or by a combination of hardware with software, the processor 220 may represent an entity (e.g., physically embodied in circuitry) capable of performing operations according to various embodiments of the present invention while configured accordingly. Alternatively, as another example, when the processor 220 is embodied as an executor of software instructions, the software instructions may specifically configure the processor 220 to perform the algorithms and/or operations described herein when the software instructions are executed.

Memory 222 is non-transitory and may include, for example, one or more volatile and/or non-volatile memories. In other words, for example, the memory 222 may be an electronic storage device (e.g., a computer readable storage medium). The memory 222 may be configured to store information, data, content, applications, software instructions, or the like, for enabling the apparatus to carry out various functions in accordance with embodiments described herein.

The communication hardware 224 may be any means such as a device or circuitry embodied in either hardware or a combination of hardware and software that is configured to receive and/or transmit data from/to a network and/or any other device, circuitry, or module in communication with participating device 110A. In this regard, the communication hardware 224 may include, for example, a network interface for enabling communications with a wired or wireless communication network. For example, the communication hardware 224 may include one or more network interface cards, antennas, buses, switches, routers, modems, and supporting hardware and/or software, or any other device suitable for enabling communications via a network. Furthermore, the communication hardware 224 may include the processing circuitry for causing transmission of such signals to a network or for handling receipt of signals received from a network.

In addition, participating device 110A further comprises quantum entangled particle reader 226 configured to "read" (e.g., measure) quantum entangled particles to obtain bit strings. When reading the quantum entangled particles, quantum entangled particle reader 226 may cause authentication tokens (e.g., the bit strings) to be generated and/or stored in authentication token repository 232. Quantum entangled particle reader 226 may utilize processor 220, memory 222, or any other hardware component included in the participating device 110A to perform these operations, as described in connection with FIGS. 3A-4C below. The quantum entangled particle reader 226 may further utilize communication hardware 224 to gather data from a variety of sources (e.g., initiating devices 100A-100N or storage device 230, as shown in FIG. 1), obtain quantum entangled particles for reading, and in some embodiments may utilize processor 220 and/or memory 222 to obtain and store bit strings following the reading of quantum entangled particles.

In addition, participating device 110A further comprises authentication circuitry 228 that is configured to provide device authentication services which may include requesting one or more authentication tokens from initiating devices 100A-100N, retrieving one or more authentication tokens from authentication token repository 232 for transmission to initiating devices 100A-100N, comparing one or more authentication tokens provided by initiating devices 100A-100N to one or more corresponding authentication tokens (e.g., from the same time interval) from authentication token repository 232 in order to determine an authentication state for initiating devices 100A-100N, and/or otherwise facilitating authentication processes between devices in a distributed system. Authentication circuitry 228 may utilize processor 220, memory 222, or any other hardware component included in the participating device 110A to perform these operations, as described in connection with FIGS. 3A-4C below. The authentication circuitry 228 may further utilize communication hardware 224 to gather data from a variety of sources (e.g., initiating devices 100A-100N or storage device 230, as shown in FIG. 1), and in some embodiments may utilize processor 220 and/or memory 222 to facilitate device authentication processes.

Finally, participating device 110A may include storage device 230 that stores data structures used by quantum entangled particle reader 226 and/or authentication circuitry 228 to provide their functionalities. Storage device 230 may be a non-transitory storage and include any number and types of physical storage devices (e.g., hard disk drives, tape drives, solid state storage devices, etc.) and/or control circuitry (e.g., disk controllers usable to operate the physical storage devices and/or provide storage functionality such as redundancy, deduplication, etc.).

As noted above, authentication token repository 232 may store any quantity of authentication tokens obtained by quantum entangled particle reader 226. Authentication token repository 232 may be hosted by participating device 110A, while another authentication token repository may be hosted by a second device (e.g., initiating device 100A) throughout a distributed system. The authentication tokens may be obtained by reading quantum entangled particles provided by quantum entangled particle generator 120. Consequently, participating device 110A and the second device (e.g., initiating device 100A) may have access to identical (or substantially similar) authentication tokens (e.g., presuming that there are no read errors on either end, and all of the pairs of quantum entangled particles remain entangled during transport) that may be known to be secure (e.g., through processes for detecting snooping of information distributed via quantum entangled particles). In addition, authentication token repository 232 may include any number of associations, categorizations, etc. to facilitate device authentication. For example, each authentication token in authentication token repository 232 may include a bit string and may be associated with a particular time interval, the time interval indicating the time over which the quantum entangled particles associated with the authentication token were obtained by the participating device 110A. Authentication token repository 232 may be implemented using any number and types of data structures (e.g., database, lists, tables, linked lists, etc.). In another example, the authentication tokens may be ordered with respect to one another (but may not include time intervals) to indicate an order in which the corresponding quantum entangled particles are received.

In an embodiment, authentication tokens may be obtained by participating device 110A via quantum key distribution. Quantum entangled particle generator 120 may distribute pairs of quantum entangled particles to devices (e.g., initiating and participating devices) throughout a distributed system. For example, one quantum entangled particle of each pair of quantum entangled particles may be distributed to participating device 110A and the second quantum entangled particle of each pair of quantum entangled particles may be distributed to initiating device 100A. Therefore, participating device 110A and initiating device 100A may have access to identical quantum entangled particles.

Quantum entangled particles may be read by quantum entangled particle reader 226 thereby collapsing the entanglement of the quantum entangled particles and obtaining an authentication token (e.g., a bit string). The quantum entangled particles may be distributed continuously to the devices and, therefore, each authentication tokens derived from the quantum entangled particles may be associated with a particular time interval. The quantum entangled particle reader 226 may store the authentication tokens in authentication token repository 232 along with some identifying information. The identifying information may include the time interval and the time interval may be used to identify an authentication token being used for a particular authentication process.

While illustrated in FIG. 2B as being a part of participating device 110A, the authentication token repository 232 may be stored (partially or entirely) in a different device operably connected to participating device 110A.

Although components 220-232 are described in part using functional language, it will be understood that the particular implementations necessarily include the use of particular hardware. It should also be understood that certain of these components 220-232 may include similar or common hardware. For example, the quantum entangled particle reader 226 and authentication circuitry 228 may each at times leverage use of the processor 220, memory 222, communication hardware 224, and/or storage device 230, such that duplicate hardware is not required to facilitate operation of these physical elements of the participating device 110A (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the participating device 110A to perform the various functions described herein.

Although quantum entangled particle reader 226 and authentication circuitry 228 may leverage processor 220 or memory 222 as described above, it will be understood that any of these elements of participating device 110A may include one or more dedicated processor, specially configured field programmable gate array (FPGA), or application specific interface circuit (ASIC) to perform its corresponding functions, and may accordingly leverage processor 220 executing software stored in a memory (e.g., memory 222), or memory 222, or communication hardware 224 for enabling any functions not performed by special-purpose hardware elements. In all embodiments, however, it will be understood that the processor 220, memory 222, communication hardware 224, and storage device 230 are implemented via particular machinery designed for performing the functions described herein in connection with such elements of participating device 110A.

In some embodiments, various components of the participating device 110A may be hosted remotely (e.g., by one or more cloud servers) and thus need not physically reside on the corresponding participating device 110A. Thus, some or all of the functionality described herein may be provided by third-party circuitry. For example, a given participating device 110A may access one or more third-party circuitries via any sort of networked connection that facilitates transmission of data and electronic information between the participating device 110A and the third-party circuitries. In turn, that participating device 110A may be in remote communication with one or more of the other components describe above as comprising the participating device 110A.

As will be appreciated based on this disclosure, embodiments described herein may be implemented by a participating device 110A. Furthermore, some embodiments may take the form of a computer program product comprising software instructions stored on at least one non-transitory computer-readable storage medium (e.g., memory 222). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by participating device 110A as described in FIG. 2B, that loading the software instructions onto a computing device or apparatus produces a special-purpose machine comprising the means for implementing various functions described herein.

Example Apparatus Operations for Communication Security

Figure 3A:
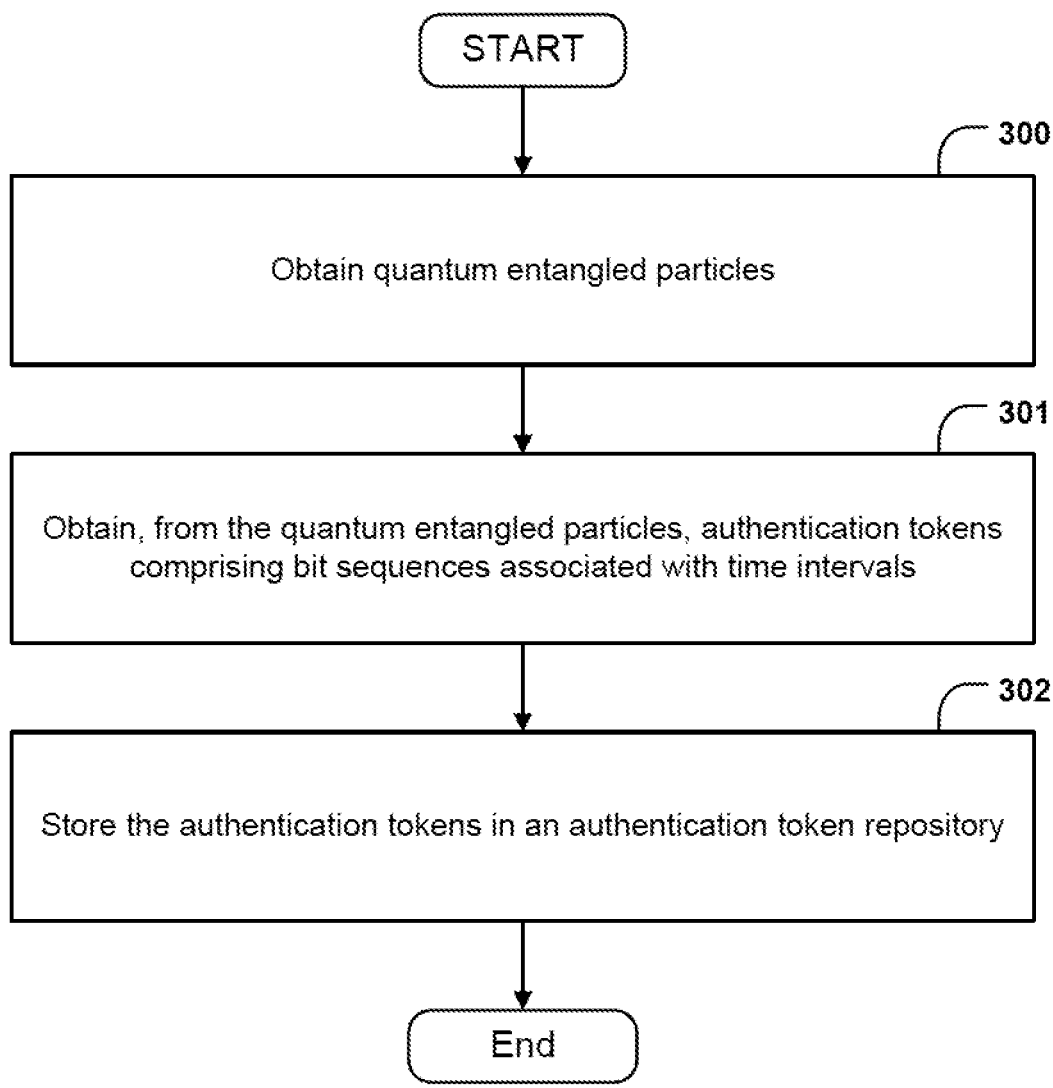
FIG. 3A illustrates an example flowchart for establishing and updating authentication token repositories via quantum key distribution, in accordance with some embodiments described herein.
Figure 3B:
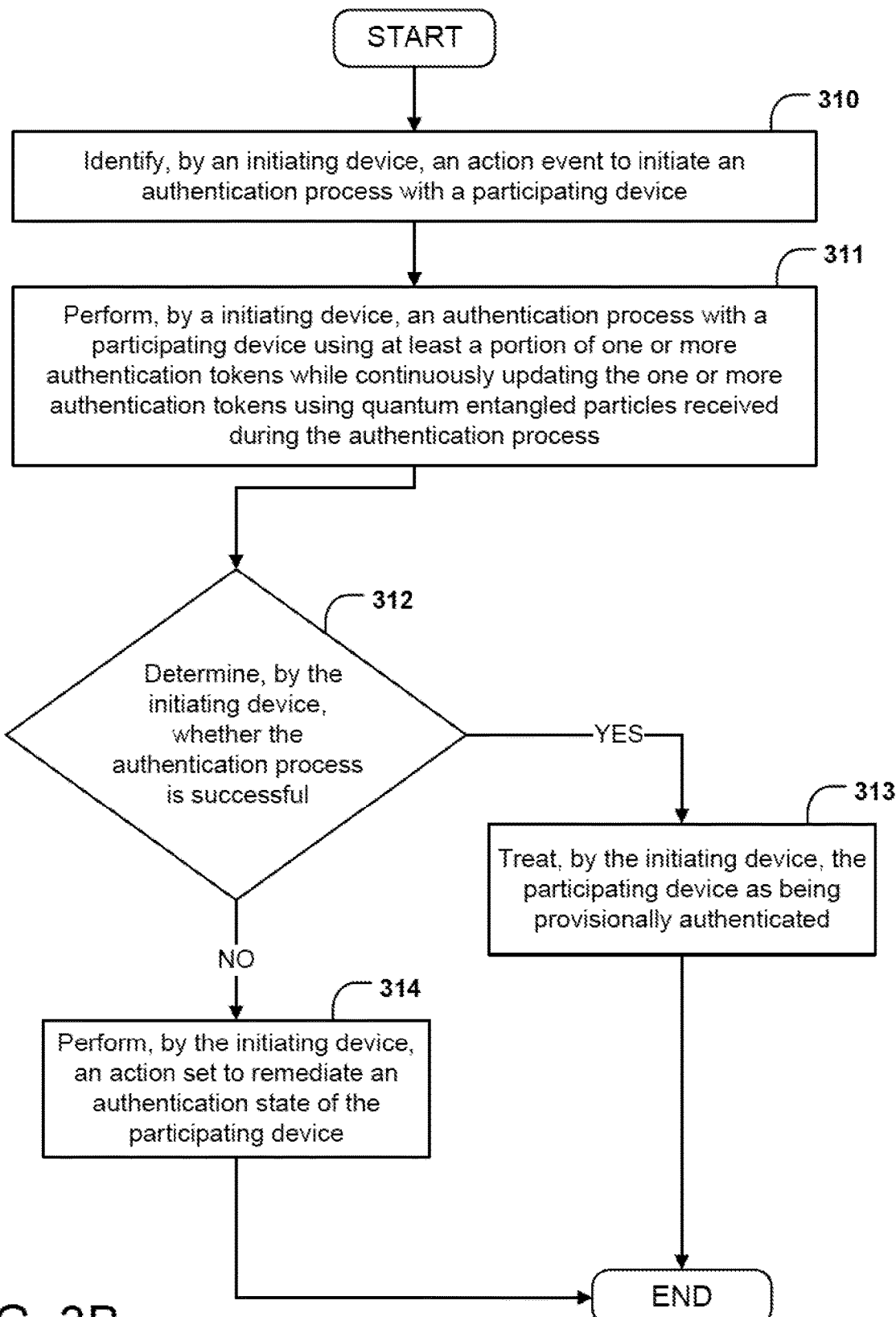
FIG. 3B illustrates an example flowchart for authentication of a participating device by an initiating device, in accordance with some embodiments described herein.

Turning to FIGS. 3A-3B, example flowcharts are illustrated that include example operations implemented by various embodiments described herein. FIGS. 3A-3B illustrate example operations for securing communications between devices.

The operations illustrated in FIGS. 3A and 3B may, for example, be performed by initiating devices shown in FIG. 1, which may in turn be embodied by initiating device 100A, which is shown and described in connection with FIG. 2A. To perform the operations described below, the initiating device 100A may utilize one or more of processor 200, memory 202, communication hardware 204, quantum entangled particle reader 206, authentication circuitry 208, storage device 210, and/or any combination thereof.

The operations illustrated in FIG. 3A may, for example, be performed by participating devices shown in FIG. 1, which may in turn be embodied by participating device 110A, which is shown and described in connection with FIG. 2B. To perform the operations described below, the participating device 110A may utilize one or more of processor 220, memory 222, communication hardware 224, quantum entangled particle reader 226, authentication circuitry 228, storage device 230, and/or any combination thereof.

Turning first to FIG. 3A, example operations are shown for obtaining quantum entangled particles via quantum key distribution and reading the quantum entangled particles to obtain shared secrets in the form of authentication tokens by initiating devices 100A-100N and participating devices 110A-110N. In order to establish shared secrets, initiating devices 100A-100N and participating devices 110A-110N may obtain identical quantum entangled particles from a quantum entangled particle generator 120 via a quantum distribution medium 150 as shown in FIG. 1.

As shown by operation 300, the initiating device 100A and participating device 110A include means, such as a processor, memory, and a quantum entangled particle reader, or the like, for obtaining quantum entangled particles. The quantum entangled particles may be provided by quantum entangled particle generator 120 via quantum distribution medium 150 in a continuous stream. Quantum entangled particles may be generated in pairs by the quantum entangled particle generator 120 and one quantum entangled particle of each pair of quantum entangled particles may be distributed to initiating device 100A. Similarly, one quantum entangled particle of each pair of quantum entangled particles may be distributed to participating device 110A.

As shown by operation 301, the initiating device 100A and participating device 110A include means, such as a processor, memory, and a quantum entangled particle reader, or the like, for obtaining, from the quantum entangled particles, authentication tokens comprising bit strings associated with time intervals. The authentication tokens may be obtained, for example, by reading the quantum entangled particles provided by the quantum entangled particle generator 120. By reading the quantum entangled particles, the quantum entangled particle reader may collapse the entanglement of the quantum entangled particles and obtain a bit string from the quantum entangled particles. The bit strings may be obtained from the continuous stream of quantum entangled particles over time and, therefore, each bit string may be associated with a particular time interval. This bit string may be a stored as an authentication token in authentication token repository 212 and authentication token repository 232. For example, an authentication token associated with a first time interval $(A_1)$ may include the bit string 01011100001010101110011000101 and may be associated with the first time interval. The first time interval $(T_1)$ may include an initial time, where the initial time=(2020/03/12 14:01:25). The duration of the subsequent time intervals may be previously agreed upon by the initiating device and participating device. Time intervals may be represented as initial times (2020/03/12 14:01:25) accompanied by a predetermined value (e.g., 1 second, 30 seconds, 1 minute, etc.), time durations (e.g., 2020/03/12 14:01:25-2020/03/12 14:02:25), and/or in other formats without departing from embodiments disclosed herein. Consequently, authentication token repository 212 and authentication token repository 232 may have matching authentication tokens with matching time intervals associated with the authentication tokens.

As shown by operation 302, the initiating device 100A and participating device 110A include means, such as a processor, memory, and a quantum entangled particle reader, or the like, for storing the authentication tokens in the authentication token repository. As authentication tokens may be obtained continuously from quantum entangled particle generator 120, the authentication token repositories of the initiating and participating devices may be continuously replenished. By continuously replenishing authentication tokens in the authentication token repositories, the initiating device 100A and the participating device 110A may perform multiple and/or persistent authentication processes prior to and during the process of establishing a secure connection between devices.

The method may end following operation 302.

Operations 300-302 may be repeated continuously in order to maintain identical (or substantially similar) authentication token repositories between two devices in a distributed system. The time intervals associated with the authentication tokens may be previously agreed-upon by the initiating and participating devices. In a first example, authentication tokens may be obtained and stored in the authentication token repository once per minute. In a second example, authentication tokens may be obtained and stored in the authentication token repository once per hour.

Turning to FIG. 3B, example operations are shown for performing one or more device authentication processes by an initiating device 100A. For example, an initiating device may receive a request to establish a secure connection and/or a request for access to sensitive information from the participating device 110A. However, when received, the initiating device 100A may not be able to immediately trust that the request is from the device (e.g., the participating device 110A) from which request is alleged to originate.

As shown by operation 310, the initiating device includes means, such as processor 200, memory 202, and authentication circuitry 208, or the like, for identifying an action event to initiate an authentication process with the participating device. For example, the participating device 110A may be a banking client and the action event may be a user's desire to access financial information provided by a bank that utilizes initiating device 100A to gate access to this sensitive information. In order to obtain access to the sensitive information desired by the user of the participating device 110A, the initiating device 100A may initiate an authentication process as described below.

As shown by operation 311, the initiating device includes means, such as processor 200, memory 202, communication hardware 204, authentication circuitry 208, or the like, for performing an authentication process with a participating device using at least a portion of one or more authentication tokens while continuously updating the one or more authentication tokens using quantum entangled particles received during the authentication process. The authentication process may include requesting at least a portion of one or more authentication tokens from a participating device, transmitting at least a portion of one or more authentication tokens to a participating device, comparing at least a portion of one or more authentication tokens provided by the participating device to at least a portion of one or more corresponding authentication tokens (e.g., authentication tokens associated with matching time intervals) from authentication token repository 212, and/or other actions as described below. The authentication process may facilitate identification of an authentication state of another device.

In a first example, initiating device 100A may authenticate participating device 110A by requesting a particular authentication token from the participating device 110A. First, the initiating device may obtain an authentication token from the authentication token repository 212. The authentication token may be an authentication token associated with a second time interval $(A_2)$ and may include the following information: 100011010111001 $T_2$=(2021/06/01 12:45:00-2021/06/01 12:46:00). In this example, 100011010111001 represents the bit string obtained by reading quantum entangled particles and $T_2$=(2021/06/01 12:45:00-2021/06/01 12:46:00) represents the time interval over which the quantum entangled particles were obtained by the initiating device. Second, the initiating device may request a complementary authentication token (e.g., an authentication token associated with the same time interval) from the participating device 110A via the communications network 140 (as shown in FIG. 1). Third, the initiating device 100A may obtain the complementary authentication token from the participating device (e.g., complementary $A_2$) and compare the complementary $A_2$ to the $A_2$ selected from authentication token repository 212 by the initiating device 100A. The complementary $A_2$ may include the following information 100011010111001 $T_2$=(2021/06/01 12:45:00-2021/06/01 12:46:00) and, therefore, may match the $A_2$ selected by the initiating device. Consequently, the initiating device 100A may obtain an authentication state of the participating device that indicates the participating device 110A has been authenticated. In the event that the complementary $A_2$ does not match the $A_2$ selected by the initiating device 100A, the initiating device 100A may obtain an authentication state of the participating device 110A that indicates the participating device 110A has not been authenticated.

In a second example, initiating device 100A may authenticate participating device 110A by establishing an offset rule and providing an authentication token to the participating device 110A. First, the initiating device 100A may obtain an authentication token from the authentication token repository 212. The authentication token may be an authentication token associated with a second time interval ($A_2$) and may include the following information: 100011010111001 $T_2$=(2021/06/01 12:45:00-2021/06/01 12:46:00). Second, the initiating device 100A may obtain an offset M governing the exchange of authentication tokens between the devices. Specifically, the offset may indicate that for any authentication token associated with a time interval $T_N$ received by the participating device 110A, the participating device 110A may transmit an authentication token associated with a time interval $T_N$+M. For example, $A_2$ may be associated with the time interval $T_2$. Third, the initiating device 100A may transmit the offset to the participating device 110A via the communications network 140. Fourth, the initiating device 100A may transmit a first authentication token to the participating device 110A. This first authentication token may be associated with $T_2$. Fifth, the initiating device 100A may obtain a complementary authentication token from the participating device 110A. Where the offset M is 3, the complementary authentication token may be authentication token $A_5$ associated with the time interval $T_5$. $A_5$ may include the following information: 110100100010001 $T_5$=(2021/06/01 12:49:00-2021/06/01 12:50:00). Sixth, the initiating device 100A may compare the complementary authentication token to a second authentication token, the second authentication token being associated with $T_5$ and stored in its own authentication token repository 212. Specifically, the complementary authentication token and the second authentication token may both be associated with $T_5$ (2021/06/01 12:49:00-2021/06/01 12:50:00) and may include identical bit strings 110100100010001. Therefore, the initiating device 100A may obtain an authentication state for the participating device 110A indicating that the participating device 110A has been authenticated. In the event that the complementary authentication token does not match the second authentication token, the initiating device 100A may obtain an authentication state of the participating device 110A that indicates the participating device 110A has not been authenticated.

In a third example, initiating device 100A and participating device 110A may authenticate each other by exchanging at least a portion of one or more authentication tokens. First, the initiating device 100A may obtain a portion of an authentication token from authentication token repository 212. The authentication token may be an authentication token associated with the second time interval ($A_2$) and may include the following information: 100011010111001 $T_2$= (2021/06/01 12:45:00-2021/06/01 12:46:00). The portion of the authentication token may be the first six bits of the bit string: 100011. Second, the initiating device 100A may transmit the portion of the bit string to the participating device 110A. By doing so, the initiating device 100A may not reveal the entire authentication token $A_2$ to the participating device and/or any third parties attempting to interfere via communication network 140. Third, the initiating device 100A may obtain a portion of a complementary authentication token from the participating device 110A. The complementary authentication token may be associated with $T_2$ and may be the last six bits of a bit string: 111001. Fourth, the initiating device 100A may compare the portion of the complementary authentication token to a second portion of the authentication token obtained by the initiating device 100A from authentication token repository 212. The initiating device 100A may determine that the last six bits of the bit string associated with the corresponding authentication token $T_2$ (111001) matches the last six bits of the bit string associated with the authentication token $T_2$ (111001). Therefore, the initiating device 100A may obtain an authentication state for the participating device 110A indicating that the participating device 110A has been authenticated. In the event that the portion of the complementary authentication token does not match the portion of the authentication token, the initiating device 100A may obtain an authentication state of the participating device 110A that indicates the participating device 110A has not been authenticated. In this example, the participating device 110A may similarly authenticate the initiating device 100A by comparing portions of authentication tokens received from the initiating device 100A to portions of authentication tokens stored in authentication token repository 232.

In a fourth example, initiating device 100A may authenticate participating device 110A by sending challenges based on portions of authentication sequences to the participating device 110A. First, the initiating device 100A may select a portion of an authentication token from authentication token repository 212. The authentication token may be an authentication token associated with a second time interval ($A_2$) and may include the following information: 100011010111001 $T_2$=(2021/06/01 12:45:00-2021/06/01 12:46:00). The portion of the authentication token may be the first six bits of the bit string: 100011. Second, the initiating device 100A may send a challenge based on the portion of the authentication sequence to the participating device 110A. The challenge may require the participating device 110A to send the first six bits of a corresponding (e.g., same time interval) authentication token to the initiating device 100A. Third, the initiating device 100A may obtain a challenge response from the participating device 110A. The challenge response may include the following six bits: 100011. Therefore, the initiating device 100A may determine that the challenge response matches the selected portion of the authentication token. The initiating device 100A may then elect to continue the authentication process (e.g., by sending additional challenges to the participating device 110A) if a confidence level requirement is unmet. The confidence level requirement may indicate, for example, that five successful challenges are required in order to authenticate a device. Therefore, the authentication process may continue for four additional challenges prior to establishing an authentication state for the participating device 110A.

In a fifth example, the authentication process may include a synchronization step prior to exchanging authentication tokens. In one scenario, the synchronization step may involve the use of a synchronized clock (e.g., using the Network Time Protocol (NTP)) to determine time intervals for authentication tokens by the initiating device 100A and the participating device 110A. In a second scenario, the synchronization step may involve accounting for differences between clocks used by the initiating device 100A and participating device 110A (where the devices do not share a clock and do not connect their clocks for synchronization). In this second scenario, synchronizing the clocks may involve exchanging a portion of one or more authentication tokens of the initiating device 100A and a portion of the one or more authentication tokens of the participating device 110A. The authentication circuitry 208 may use the exchanged portions to identify an authentication token indexing difference between the initiating device and the participating device. For example, the participating device 110A may transmit the following authentication token ($A_2$) to the initiating device 100A: 100011010111001 $T_2$=(2021/06/01 12:45:00). The initiating device 100A may compare $A_2$ provided by the participating device 110A to the corresponding authentication token $A_2$ stored in authentication token repository 212. The corresponding $A_2$ stored in authentication repository 212 may include the following information: 100011010111001 $T_2$=(2021/06/01 12:45:30). Therefore, the initiating device 100A may determine a thirty second delay between the clocks. Consequently, the initiating device 100A may add an indexing difference of thirty seconds to any time interval provided by the participating device 110A during an authentication process to ensure the authentication token comparisons are valid.

The indexing difference may alternatively be determined using trusted time stamps. By transmitting authentication tokens encoded with trusted time stamps, the initiating device 100A may verify the time that authentication tokens are generated by the participating device 110A through calibration of clocks. In addition, the indexing difference may be generated without needing to rely on the stated time intervals within the authentication tokens themselves; rather, the time interval associated with the authentication token may be identified by reference to a clock from a trusted third party (e.g., a Time Stamping Authority (TSA)).

To implement trusted time stamps, the participating device 110A may generate a bit string as previously described in FIG. 3A. The participating device 110A may perform a cryptographic hash function to encode the bit string. The participating device 110A may generate a trusted time stamp via a TSA (e.g., a trusted entity having a known time difference from a National Measurement Institute (NMI), which is calibrated (either directly or via additional intermediaries) to an International Timing Authority (ITA)). The TSA may add a trusted time stamp to the hash of the authentication token. In addition, the TSA may cryptographically bind the hash of the bit string to the time stamp using a digital signature to obtain a time stamp token (TST). The TST may be transmitted to the initiating device 100A for authentication and may be treated as the authentication token in this scenario. The trusted time stamps may be impossible to modify and, therefore, may thwart efforts by third parties to change the time interval and gain unauthorized access to the authentication token. The initiating device 100A may similarly create a trusted time stamp for each bit string comprising an authentication token. Upon receipt of a TST from the participating device 110A, the initiating device 100A may determine an indexing difference by comparing the trusted time stamp for a given bit string to the trusted time stamp from the corresponding TST received from the participating device 110A.

As shown by operation 312, the initiating device includes means, such as processor 200, memory 202, authentication circuitry 208, or the like, for determining whether the authentication process is successful. The initiating device 100A may determine whether the authentication process is successful by evaluating the authentication state of the participating device 110A, as described previously. If the authentication state of the participating device 110A indicates that the device has been authenticated, the method may proceed to operation 313. If the authentication state of the participating device 110A indicates that the device has not been authenticated, the method may proceed to operation 314.

As shown by operation 313, the initiating device includes means, such as processor 220, memory 222, and authentication circuitry 228, or the like, for treating the participating device 110A as being provisionally authenticated. The participating device 110A may be treated as being provisionally authenticated by continuing to treat participating device 110A as being authenticated, but subject to additional future authentication processes. The participating device 110A may be treated as being provisionally authenticated following an exchange of authentication tokens as described above. Provisional authentication may require additional and/or continuous authentication processes prior to establishing a secure connection to the participating device 110A. Once the initiating device 100A and participating device 110A establish a secure connection, they may exchange sensitive information. Establishing the secure connection may include agreeing on a shared method for encrypting sensitive information. This shared method may be previously established, shared as part of the authentication process, and/or established by one of the devices following the granting of provisional authentication by the initiating device 100A. The encryption method may be a symmetric cryptographic key based on an unused authentication token bit string. In this scenario, initiating device 100A may transmit a request for a particular authentication token (e.g., $A_6$) to participating device 110A to establish the cryptographic key. Following the granting of provisional authentication by initiating device 100A, participating device 110A may be able exchange sensitive information with initiating device 100A. As mentioned previously, sensitive information may be encrypted prior to the exchange.

The method may end following operation 313.

Returning to operation 312, the method may proceed to operation 314 if the authentication process is determined as being unsuccessful.

As shown by operation 314, the initiating device includes means, such as processor 220, memory 222, and authentication circuitry 228, or the like, for performing an action set to remediate an authentication state of the participating device 110A. The action set may include one or more of the following actions: (i) performing an additional authentication of the participating device 110A with another authentication token, (ii) terminating the authentication process and the computer-implemented services, (iii) restricting some of the computer-implemented services (temporarily or permanently) to prevent transmission of sensitive information while allowing other computer-implemented services to continue, and/or (iv) performing a third party authentication of the participating device 110A. The action set may include other actions without departing from embodiments disclosed herein.

The method may end following operation 314.

Example System Operations

Figure 4A:
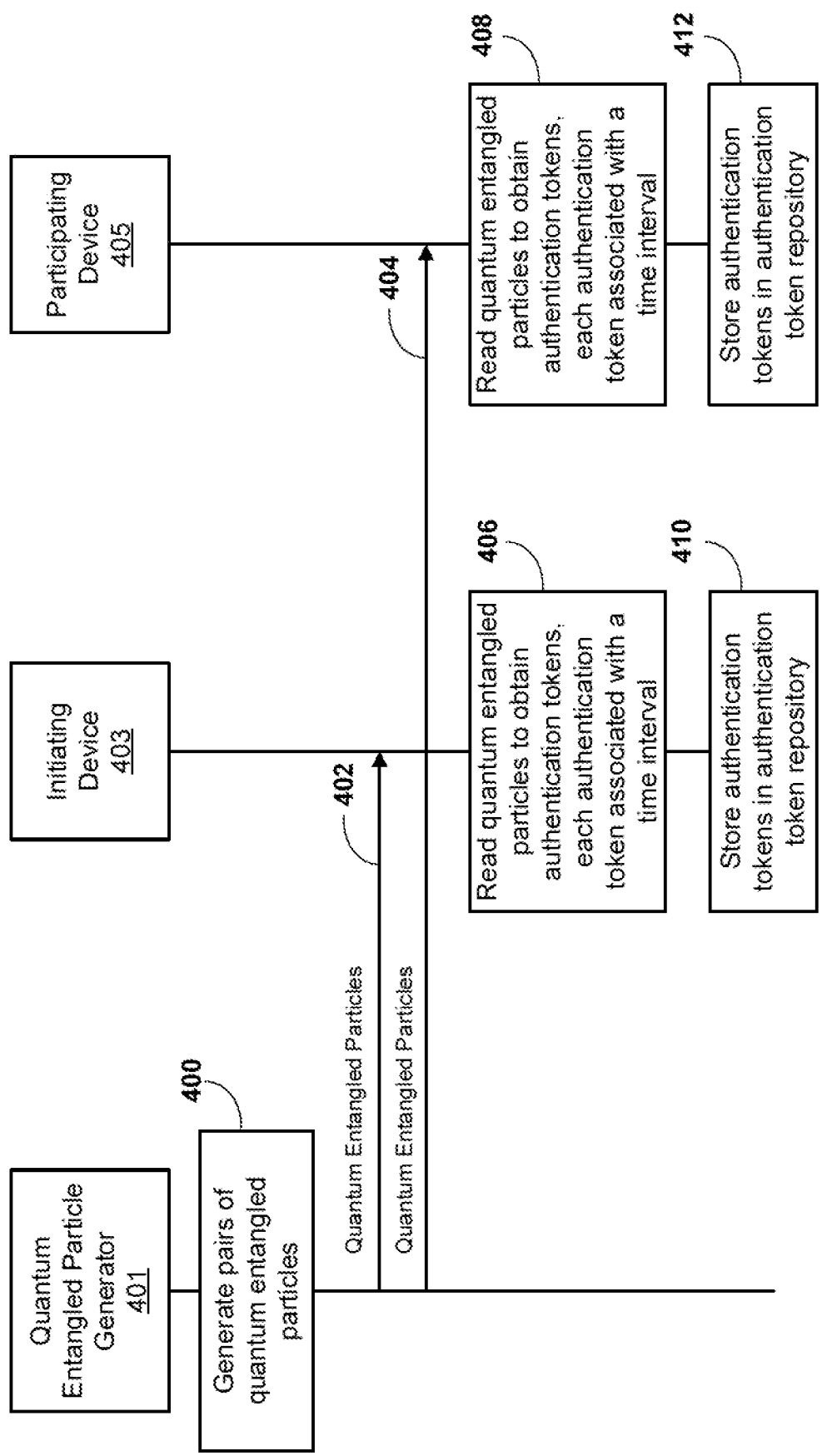
FIGS. 4A-4C illustrates example operations of a system, in accordance with some embodiments described herein.
Figure 4B:
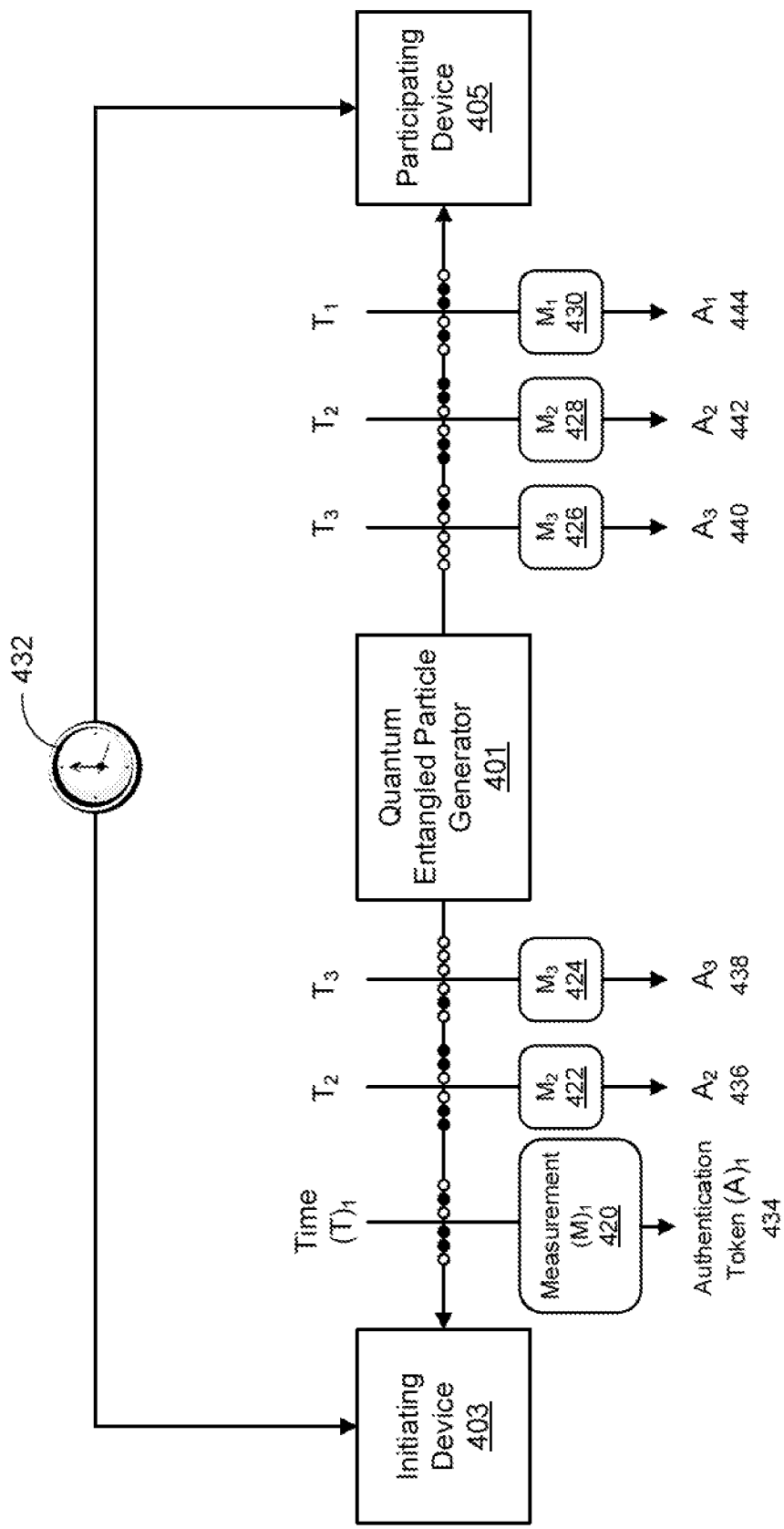
Figure 4C:
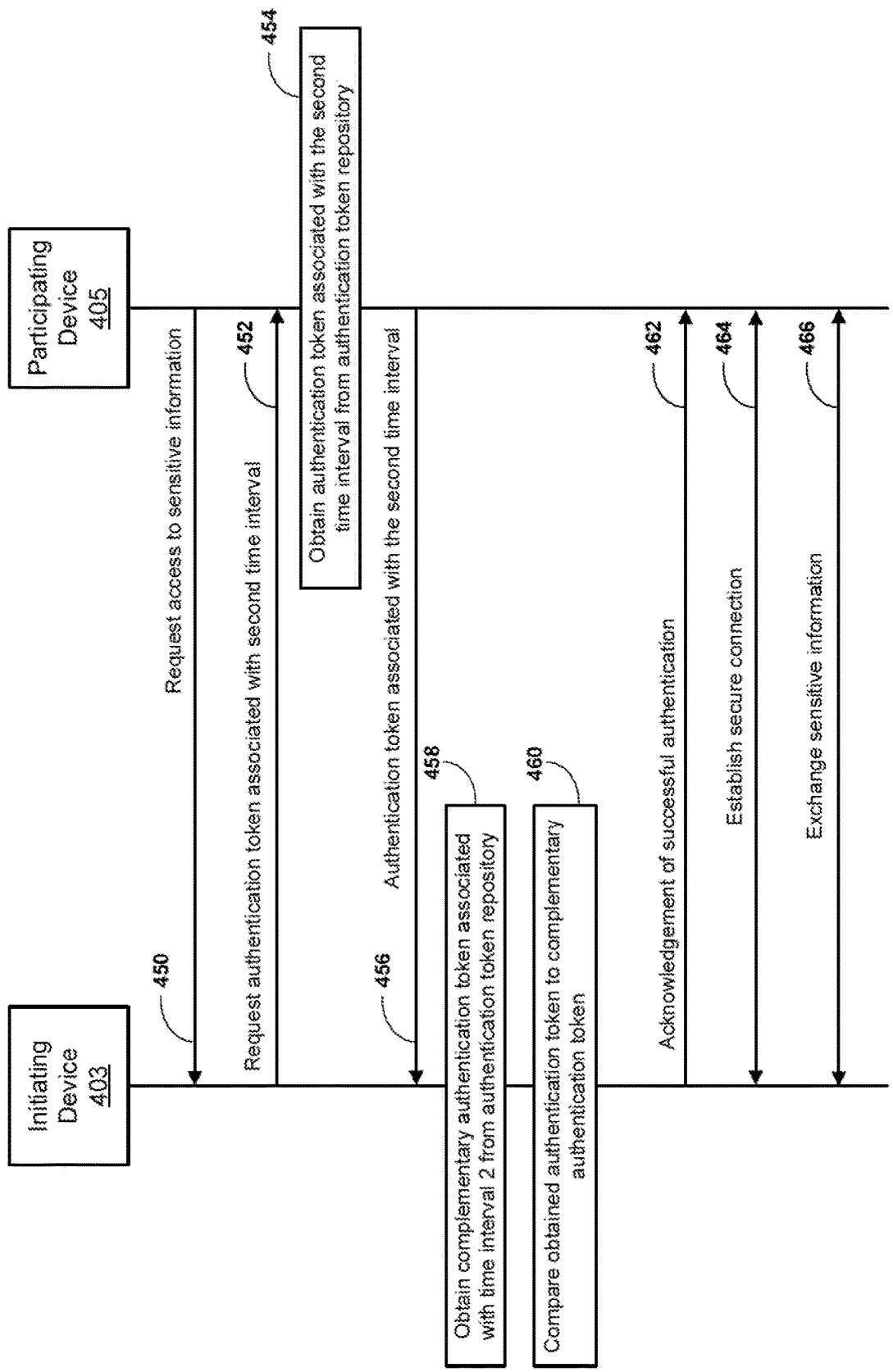

As noted above, initiating devices 100A-100N and participating devices 110A-110N may facilitate authentication of devices in a distributed system. FIGS. 4A-4C show diagrams illustrating example operations performed by components of a distributed system that may be performed when authenticating a device. In these figures, operations performed by a quantum entangled particle generator are shown along the line extending from the box labeled "quantum entangled particle generator 401." Similarly, operations performed by an initiating device are shown along the line extending from the box labeled "initiating device 403" and operations performed by a participating device are shown along the line extending from the box labeled "participating device 405." Operations impacting two or more devices, such as data transmissions between the devices, are shown using arrows extending between these lines. Generally, the operations are ordered temporally with respect to one another. However, it will be appreciated that the operations may be performed in other orders from those illustrated herein.

Turning to FIG. 4A, at operation 400, a quantum entangled particle generator 401 generates pairs of quantum entangled particles. The quantum entangled particle generator 401 may generate pairs of quantum entangled particles continuously and the quantum entangled particles may be generated in order to provide shared secrets to the initiating device 403 and the participating device 405, to facilitate authentication, and to secure communication of sensitive information between the two devices.

When generated, the quantum entangled particles may represent bit strings unknown to the quantum entangled particle generator 401 (e.g., by refraining from measuring or otherwise characterizing the generated quantum entangled particles) and, therefore, the quantum entangled particles may be in an indeterminate state. At operations 402 and 404, quantum entangled particle generator 401 transmits quantum entangled particles to the initiating device 403 and the participating device 405. The quantum entangled particles may be transmitted via an optical fiber or other transmission medium and may be transmitted in a continuous stream to both devices. The quantum entangled particle generator 401 may transmit one quantum entangled particle from each pair of quantum entangled particles to the initiating device 403 and one quantum entangled particle from each pair of quantum entangled particles to the participating device 405.

In order to obtain shared secrets from the quantum entangled particles, the initiating device 403 and participating device 405 may "read" (e.g., measure) the quantum entangled particles. At operations 406 and 408, the initiating device 403 and participating device 405 read the quantum entangled particles. Reading the quantum entangled particles may collapse the entanglement and allow the initiating device 403 and the participating device 405 to obtain identical bit strings from the quantum entangled particles. By doing so, the initiating device 403 and participating device 405 may obtain identical bit strings without transmitting any bit strings between the devices.

While not shown herein, the initiating device 403 and the participating device 405 may perform processes (e.g., verification of entanglement via testing of Bell's inequality, or other verification processes) to identify whether any other entities are also measuring or characterizing the quantum entangled particles (e.g., such as a man in the middle attempting to listen in to the quantum entangled particles being distributed over a distribution medium). In this manner, these devices may verify that the bit strings derived from the quantum entangled particles are shared secrets known only two these devices.

The initiating device 403 and the participating device 405 may obtain quantum entangled particles from the quantum entangled particle generator 401 continuously over time. In order to obtain discrete bit strings from the continuous stream of quantum entangled particles, the initiating device 403 and the participating device 405 may previously agree upon time intervals over which to collect quantum entangled particles. For example, the devices may agree to collect a bit string every minute, every thirty seconds, etc. Each bit string may represent an authentication token and each authentication token may be associated with a time interval. The initiating device 403 and the participating device 405 may synchronize and/or otherwise calibrate their clocks in order to ensure consistency of time intervals.

At operation 410 and 412, the initiating device 403 and the participating device 405 may store the authentication tokens in an authentication token repository. In order to utilize the bit strings for authentication processes, the initiating device 403 and the participating device 405 may agree on a method of dividing the bit strings obtained from the quantum entangled particles. Therefore, the authentication token repositories may contain authentication tokens associated with time intervals. The time intervals may be used by the devices to identify bit strings being used for authentication processes. The authentication token repositories may be updated continuously as quantum entangled particles are distributed to the devices.

By establishing authentication token repositories, both the initiating device 403 and the participating device 405 may have access to shared secrets to choose from over time, and the initiating device 403 and participating device 405 may perform an authentication process using, in part, these shared secrets. The authentication process may include exchanging all or a portion of one or more authentication tokens. In addition, authentication processes may be repeated continuously, at intervals, and/or via other modalities following a first authentication process in order to take advantage of the continuous stream of quantum entangled particles distributed to the devices.

Turning to FIG. 4B, an example environment is shown to illustrate the distribution of quantum entangled particles and generation of authentication tokens as described in operations 400-410 in FIG. 4A. The environment may include quantum entangled particle generator 401, initiating device 403, and participating device 405. As previously described, quantum entangled particle generator 401 may generate pairs of quantum entangled particles and may distribute one quantum entangled particle of each pair of quantum entangled particles to the initiating device 403 and the participating device 405 respectively. The quantum entangled particles may be generated and distributed continuously over time. Therefore, the initiating device 403 and the participating device 405 may utilize a shared clock 432 in order to establish shared time intervals to divide the quantum entangled particles received by each device.

For example, the initiating device 403 and the participating device 405 may agree to read (e.g., measure) the quantum entangled particles once every minute to obtain authentication tokens. Therefore, $T_1$ may represent the first minute, $T_2$ may represent the second minute, and $T_3$ may represent the third minute for both devices. At the first minute ($T_1$), the initiating device 403 may perform a first measurement ($M_1$) 420 and the participating device 405 may perform a first measurement ($M_1$) 430 to obtain authentication token ($A_1$) 434 and $A_1$ 444 respectively. The authentication tokens may include bit strings obtained by reading the quantum entangled particles and may be associated with the first time interval $T_1$. The bit string obtained by the devices at $T_1$ may be 011010 and the associated time interval may be (2021/03/20 04:08:00-2021/03/20 04:09:00).

Continuing with the above example, the initiating device 403 may perform a second measurement $M_2$ 422 at $T_2$ to obtain $A_2$ 436. $A_2$ 436 may include the bit string 110011 and may be associated with the time interval (2021/03/20 04:09:00-2021/03/20 04:10:00). Similarly, the participating device 405 may perform a second measurement $M_2$ 428 at $T_2$ to obtain $A_2$ 442. $A_2$ 442 may include the bit string 110011 and may also be associated with the time interval (2021/03/20 04:09:00-2021/03/20 04:10:00). This process may continue, with the initiating device 403 performing $M_3$ 424 at $T_3$ to obtain $A_3$ and the participating device 405 performing $M_3$ 426 at $T_3$ to obtain $A_3$ 440. $A_3$ 438 and $A_3$ 440 may include the bit string 010000 and may be associated with the time interval (2021/03/20 04:10:00-2021/03/20 04:11:00). This process may repeat continuously and both devices may store the authentication tokens in their authentication token repository for use in future and/or ongoing authentication processes as described below.

Turning to FIG. 4C, at operation 450, the participating device 405 may request access to sensitive information. For example, the participating device 405 may be a banking client and a user of the participating device 405 may desire to access financial information provided by a bank that utilizes the initiating device 403 to gate access to this sensitive information. In order to obtain access to the sensitive information desired by the user of the participating device 405, the initiating device 403 may initiate an authentication process as described below.

Following receipt of the request for sensitive information from the participating device 405, the initiating device 403 may begin a process to authenticate the participating device 405. In order to do so, the initiating device 403 may first determine a process for authentication. This process may involve unilateral authentication or mutual authentication between devices. This process may involve exchanging all or a portion of one or more authentication tokens and may be previously agreed-upon by the devices. See FIG. 3B for additional details regarding authentication processes.

At operation 452, the initiating device 403 may request the authentication token associated with second time interval ($T_2$). The authentication token associated with time interval $T_2$ may include the bit string 110011 and may be associated with the time interval (2021/03/20 04:09:00-2021/03/20 04:10:00). The participating device 405 may have access to this authentication token from an authentication token repository. The initiating device 403 may have access to a complementary authentication token (e.g., an authentication token associated with the same time interval $T_2$) in a second authentication token repository. As the authentication tokens may be obtained via quantum key distribution, the authentication tokens obtained by both devices may be identical (or substantially similar).

At operation 454, the participating device 405 may obtain the authentication token associated with the second time interval $T_2$ from the authentication token repository. At operation 456, the participating device 405 may send the authentication token associated with the second time interval $T_2$ to the initiating device 403.

At operation 458, the initiating device 403 may obtain the complementary authentication token associated with the second time interval $T_2$ from the second authentication token repository. The complementary authentication token associated with the second time interval $T_2$ may include the bit string 110011 and may be associated with the time interval (2021/03/20 04:09:00-2021/03/20 04:10:00).

At operation 460, the initiating device 403 may compare the obtained authentication token (e.g., from participating device 405) to the complementary authentication token (e.g., from the authentication token repository). The initiating device 403 may compare the obtained authentication token to the complementary authentication token in order to determine whether the participating device 405 has access to matching authentication tokens (and, therefore, identical quantum entangled particles). If the obtained authentication token matches the complementary authentication token, the initiating device 403 may authenticate the participating device 405. If the obtained authentication token does not match the complementary authentication token, the request for access to sensitive information may be denied. Denying the request for sensitive information may involve sending a denial notification to the participating device 405, initiating a second authentication process with participating device 405, and/or other actions to remediate the authentication state.

At operation 462, the initiating device 403 sends an acknowledgement of the successful authentication to the participating device 405 via the communication network (in this example, the request is authenticated). Successful authentication may require multiple and/or ongoing authentication processes. The authentication process described above represents one example of an authentication process. Following successful authentication, the initiating device 403 and the participating device 405 may establish a secure connection and exchange sensitive information as described below.

At operation 464, a secure connection is established between the initiating device 403 and the participating device 405. Establishing a secure connection may involve agreeing on a shared method for encrypting sensitive information. This shared method may be previously established, may be shared as part of the request for authentication, and/or may be established by one of the devices following operation 462. For example, the encryption method may include use of a symmetric cryptographic key based on at least a portion of an additional authentication token. In this example, the participating device 405 may send a time interval associated with this additional authentication token with the request for access to sensitive information (e.g., operation 450). Alternatively, the initiating device 403 or participating device 405 may send this time interval following the authentication of the participating device 405. Once this secure connection has been established, the initiating device 403 and participating device 405 may exchange sensitive information as described below. The secure connection may be established via other methods (e.g., derivation of a session key using asymmetric encryption) without departing from embodiments disclosed herein.

At operation 466, the initiating device 403 and the participating device 405 exchange sensitive information. The sensitive information may include, for example, financial information, future plans, personal information, and/or other types of data. In addition, the initiating device 403 and participating device 405 may take advantage of the secure connection in order to ensure the authentication token repositories hosted by each device are identical (or substantially similar). By sending the sensitive information via the secure connection after authentication, the sensitive information may be less likely to be distributed to unintended recipients.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also described as may be set forth in some of the appended claims. Although specific terms are employed herein, they are used in a generic and descriptive sense only and not for purposes of limitation.

What is claimed is:

1. A method for authentication between an initiating device and a participating device operably connected to each other with a communication network and quantum distribution medium used to transmit data between the initiating device and the participating device, the method comprising:
identifying, by authentication circuitry of the initiating device, an action event to initiate an authentication process with the participating device;
performing, at least in part by the authentication circuitry and based on the action event, the authentication process with the participating device to establish an authentication state of the participating device, the authentication process using at least a portion of one or more authentication tokens while continuously updating the one or more authentication tokens using quantum particles obtained during the authentication process and using the quantum distribution medium, wherein the authentication process includes:
obtaining, by the authentication circuitry, a portion of an authentication token of the one or more authentication tokens,
transmitting, by communication hardware of the initiating device, the portion of the authentication token to the participating device,
obtaining, by the communication hardware, a portion of a complementary authentication token,
making a determination, by the authentication circuitry, that the portion of the complementary authentication token matches a portion of a third authentication token, the portion of the third authentication token being associated with the portion of the authentication token, and
obtaining, by the authentication circuitry and based on the determination, the authentication state of the participating device;
making a determination, by the authentication circuitry and based on the authentication state of the participating device, about whether the authentication process is successful; and
in an instance in which the determination indicates that the authentication process is successful, treating, by the authentication circuitry and based on the determination, the participating device as being provisionally authenticated.

2. The method of claim 1, further comprising:
in an instance in which the determination indicates that the authentication process is unsuccessful, performing, at least in part by the authentication circuitry and based on the determination, an action set to remediate the authentication state of the participating device.

3. The method of claim 1, wherein the authentication process further comprises:
obtaining, by the authentication circuitry, an authentication token of the one or more authentication tokens;
requesting, by the communication hardware, a complementary authentication token from the participating device;
obtaining, by the communication hardware, the complementary authentication token from the participating device;
making a second determination, by the authentication circuitry, that the complementary authentication token matches the authentication token, wherein the complementary authentication token matches the authentication token when pairs of the quantum particles are distributed to the initiating device and the participating device; and
obtaining, by the authentication circuitry and based on the second determination, the authentication state of the participating device.

4. The method of claim 1, wherein the authentication process further comprises:
obtaining, by the authentication circuitry, a second authentication token of the one or more authentication tokens;
requesting, by the communication hardware, a second complementary authentication token from the participating device;
obtaining, by the communication hardware, the second complementary authentication token from the participating device;
making a third determination, by the authentication circuitry, that the second complementary authentication token does not match the second authentication token, wherein the second complementary authentication token matches the second authentication token when pairs of the quantum particles are distributed to the initiating device and the participating device; and
obtaining, by the authentication circuitry and based on the third determination, a second authentication state of the participating device.

5. The method of claim 1, wherein the authentication process further comprises:
obtaining, by the authentication circuitry, a first authentication token of the one or more authentication tokens;
obtaining, by the authentication circuitry, an offset;
transmitting, by the communication hardware, the offset to the participating device;
transmitting, by the communication hardware, the first authentication token to the participating device;
obtaining, by the communication hardware, a complementary authentication token from the participating device;
making a second determination, by the authentication circuitry and based on the offset, that the complementary authentication token matches a second authentication token, wherein the second authentication token is based on the first authentication token and the offset, and wherein the complementary authentication token matches the second authentication token when pairs of the quantum particles are distributed to the initiating device and the participating device; and
obtaining, by the authentication circuitry and based on the second determination, the authentication state of the participating device.

6. The method of claim 1, wherein the authentication process further comprises:
selecting, by the authentication circuitry, a portion of an authentication token of the one or more authentication tokens;
sending, by the communication hardware, a challenge based on the portion of the authentication token to the participating device;

obtaining, by the communication hardware, a challenge response from the participating device;

making a second determination, by the authentication circuitry, that the challenge response matches the portion of the authentication token; and electing, by the authentication circuitry, to continue an authentication of the participating device based on the second determination and based on an unmet confidence level requirement.

7. The method of claim 1, wherein the authentication process comprises:

performing a synchronization, by the authentication circuitry, of the one or more authentication tokens with a corresponding one or more authentication tokens of the participating device.

8. The method of claim 7, wherein the synchronization accounts for differences between clocks used by the initiating device and the participating device.

9. The method of claim 8, wherein the synchronizing comprises:

exchanging, by the communication hardware, a portion of the one or more authentication tokens of the initiating device and a portion of the one or more authentication tokens of the participating device; and using the exchanged portions, by the authentication circuitry, to identify an authentication token indexing difference between the initiating device and the participating device.

10. The method of claim 1, wherein the one or more authentication tokens comprise bit strings associated with time intervals.

11. An initiating device, the initiating device comprising:
authentication circuitry configured to:
identify an action event to initiate an authentication process with a participating device,
perform at least a part of the authentication process, based on the action event, with the participating device to establish an authentication state of the participating device, the authentication process using at least a portion of one or more authentication tokens while continuously updating the one or more authentication tokens using quantum particles obtained during the authentication process and using a quantum distribution medium, wherein the authentication circuitry is configured to perform the authentication process by:
obtaining a portion of an authentication token of the one or more authentication tokens,
causing communication hardware to transmit the portion of the authentication token to the participating device, and obtain a portion of a complementary authentication token,
making a determination that the portion of the complementary authentication token matches a portion of a third authentication token, the portion of the third authentication token being associated with the portion of the authentication token, and
obtaining, based on the determination, the authentication state of the participating device,
make a determination, based on the authentication state of the participating device, about whether the authentication process is successful, and
wherein the authentication circuitry is further configured to, in an instance in which the determination indicates that the authentication process is successful, treat, based on the determination, the participating device as being provisionally authenticated.

12. The initiating device of claim 11, wherein the authentication circuitry is further configured to:
in an instance in which the determination indicates that the authentication process is unsuccessful, perform at least a part of an action set, based on the determination, to remediate the authentication state of the participating device.

13. The initiating device of claim 11,
wherein the authentication circuitry is further configured to obtain an authentication token of the one or more authentication tokens,
wherein the communication hardware is further configured to:
request a complementary authentication token from the participating device; and
obtain the complementary authentication token from the participating device,
wherein the authentication circuitry is further configured to:
make a second determination that the complementary authentication token matches the authentication token, wherein the complementary authentication token matches the authentication token when pairs of the quantum particles are distributed to the initiating device and the participating device, and
obtain the authentication state of the participating device.

14. The initiating device of claim 11,
wherein the authentication circuitry is configured to obtain a second authentication token of the one or more authentication tokens,
wherein the communication hardware is further configured to:
request a second complementary authentication token from the participating device, and
obtain the second complementary authentication token from the participating device, wherein the authentication circuitry is further configured to:
make a third determination that the second complementary authentication token does not match the second authentication token, wherein the second complementary authentication token matches the second authentication token when pairs of the quantum particles are distributed to the initiating device and the participating device; and
obtain, based on the third determination, a second authentication state of the participating device.

15. The initiating device of claim 11,
wherein the authentication circuitry is further configured to:
obtain a first authentication token of the one or more authentication tokens; and
obtain an offset,
wherein the communication hardware is further configured to:
transmit the offset to the participating device, transmit the first authentication token to the participating device, and obtain a complementary authentication token from the participating device,
wherein the authentication circuitry is further configured to:
make a second determination, based on the offset, that the complementary authentication token matches a second authentication token, wherein the complementary authentication token matches the second authentication token when pairs of the quantum particles are distributed to the initiating device and the participating device, the second authentication token being based on the first authentication token and the offset; and obtain, based on the second determination, the authentication state of the participating device.

16. The initiating device of claim 11,
wherein the authentication circuitry is further configured to select a portion of an authentication token of the one or more authentication tokens,
wherein the communication hardware is further configured to:
send a challenge based on the portion of the authentication token to the participating device; and
obtain a challenge response from the participating device,
wherein the authentication circuitry is further configured to:
make a second determination that the challenge response matches the portion of the authentication token; and
elect to continue an authentication of the participating device based on the second determination and based on an unmet confidence level requirement.

17. The initiating device of claim 11, wherein the authentication circuitry is further configured to perform a synchronization of the one or more authentication tokens with one or more authentication tokens of the participating device.

18. The initiating device of claim 17, wherein the synchronization accounts for differences between clocks used by the initiating device and the participating device.

19. The initiating device of claim 18, wherein the communication hardware is further configured to exchange a portion of the one or more authentication tokens of the initiating device and a portion of the one or more authentication tokens of the participating device,
wherein the authentication circuitry is further configured to use the exchanged portions to identify an authentication token indexing difference between the initiating device and the participating device.

20. The initiating device of claim 18, wherein the one or more authentication tokens comprise bit strings associated with time intervals.

* * * * *